US012738530B2

(12) United States Patent
Ryu et al.

(10) Patent No.: US 12,738,530 B2
(45) Date of Patent: Sep. 15, 2026

(54) SOLID ION CONDUCTOR COMPOUND, SOLID ELECTROLYTE COMPRISING SAME, ELECTROCHEMICAL CELL COMPRISING SAME, AND MANUFACTURING METHOD THEREOF

(71) Applicant: SAMSUNG SDI CO., LTD., Yongin-si (KR)

(72) Inventors: Saebom Ryu, Suwon-si (KR); Youngsin Park, Suwon-si (KR); Junhwan Ku, Suwon-si (KR); Soyeon Kim, Suwon-si (KR); Shintaro Kitajima, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 609 days.

(21) Appl. No.: 18/013,766

(22) PCT Filed: Jun. 22, 2021

(86) PCT No.: PCT/KR2021/007845
§ 371 (c)(1),
(2) Date: Dec. 29, 2022

(87) PCT Pub. No.: WO2022/071644
PCT Pub. Date: Apr. 7, 2022

(65) Prior Publication Data

US 2023/0352728 A1 Nov. 2, 2023

(30) Foreign Application Priority Data

Sep. 29, 2020 (KR) ........................ 10-2020-0127521

(51) Int. Cl.
*H01M 10/0562* (2010.01)
*H01M 4/02* (2006.01)
(Continued)

(52) U.S. Cl.
CPC ..... *H01M 10/0562* (2013.01); *H01M 4/0404* (2013.01); *H01M 4/587* (2013.01);
(Continued)

(58) Field of Classification Search
None
See application file for complete search history.

(56) References Cited

U.S. PATENT DOCUMENTS 6,402,795 B1 6/2002 Chu et al.
8,075,865 B2 12/2011 Deiseroth et al.
(Continued)

FOREIGN PATENT DOCUMENTS

CN 111448702 A 7/2020
JP 2015-072783 A 4/2015
(Continued)

OTHER PUBLICATIONS

Marvin A. Kraft et al., "Influence of Lattice Polarizability on the Ionic Conductivity in the Lithium Superionic Argyrodites Li6PS5X (X=Cl, Br, I)", J. Am. Chem. Soc. 139, 10909 (2017).
(Continued)

*Primary Examiner* — Ula C Ruddock
*Assistant Examiner* — Maria F Orozco
(74) *Attorney, Agent, or Firm* — Lee IP Law, P.C.

(57) ABSTRACT

The present invention relates to a solid ion conductor compound represented by $Li_aM_xT_yP_bS_cCl_dX_e$ and having an argyrodite crystal structure, a solid electrolyte including the same, and an electrochemical cell including the same.

27 Claims, 10 Drawing Sheets

(51) Int. Cl.

| | |
|---|---|
| ***H01M 4/04*** | (2006.01) |
| ***H01M 4/587*** | (2010.01) |
| ***H01M 4/62*** | (2006.01) |

(52) U.S. Cl.

CPC ...... *H01M 4/626* (2013.01); *H01M 2004/027* (2013.01); *H01M 2300/008* (2013.01)

(56) References Cited

U.S. PATENT DOCUMENTS

| | | | | |
|---|---|---|---|---|
| 9,634,358 | B2 | 4/2017 | Matsushita | |
| 9,812,734 | B2 | 11/2017 | Miyashita et al. | |
| 10,090,558 | B2 | 10/2018 | Kambara et al. | |
| 10,483,587 | B2 | 11/2019 | Terai et al. | |
| 2015/0236373 | A1* | 8/2015 | Ohtomo | H01M 10/052 264/104 |
| 2016/0156064 | A1 | 6/2016 | Miyashita et al. | |
| 2016/0240886 | A1 | 8/2016 | Yamasaki et al. | |
| 2016/0248120 | A1 | 8/2016 | Yamada et al. | |
| 2017/0187066 | A1* | 6/2017 | Tsujimura | H01M 10/052 |
| 2017/0222261 | A1* | 8/2017 | Kambara | H01M 10/0525 |
| 2018/0226633 | A1 | 8/2018 | Fujuki et al. | |
| 2018/0351148 | A1 | 12/2018 | Schneider et al. | |
| 2019/0140313 | A1 | 5/2019 | Terai et al. | |
| 2019/0148769 | A1 | 5/2019 | Aihara et al. | |
| 2019/0198916 | A1 | 6/2019 | Yoon et al. | |
| 2020/0006808 | A1 | 1/2020 | Utsuno et al. | |
| 2020/0127325 | A1 | 4/2020 | Takahashi et al. | |
| 2020/0358132 | A1 | 11/2020 | Yamada | |
| 2020/0381772 | A1 | 12/2020 | Kim et al. | |
| 2021/0020984 | A1* | 1/2021 | Ito | H01M 10/0562 |
| 2021/0094824 | A1 | 4/2021 | Lee et al. | |
| 2021/0135278 | A1 | 5/2021 | Kim et al. | |
| 2021/0143468 | A1 | 5/2021 | Kim et al. | |
| 2021/0249682 | A1 | 8/2021 | Morinaka et al. | |
| 2021/0280873 | A1 | 9/2021 | Ku et al. | |
| 2021/0336269 | A1 | 10/2021 | Sugimoto et al. | |
| 2022/0115640 | A1 | 4/2022 | Sugimoto et al. | |
| 2023/0084324 | A1 | 3/2023 | Ryu et al. | |
| 2023/0275261 | A1 | 8/2023 | Ku et al. | |
| 2023/0291004 | A1 | 9/2023 | Lee et al. | |

FOREIGN PATENT DOCUMENTS

| | | | |
|---|---|---|---|
| JP | 2017-045613 | A | 3/2017 |
| JP | 2017-117639 | A | 6/2017 |
| JP | 2017-117753 | A | 6/2017 |
| JP | 2018-206611 | A | 12/2018 |
| JP | 2019-036536 | A | 3/2019 |
| JP | 6709886 | B1 | 5/2020 |
| KR | 10-2017-0077014 | A | 7/2017 |
| KR | 10-1952196 | B1 | 2/2019 |
| KR | 10-2019-0051962 | A | 5/2019 |
| KR | 10-2019-0079132 | A | 7/2019 |
| KR | 10-2002596 | B1 | 7/2019 |
| KR | 10-2020-0000849 | A | 1/2020 |
| WO | WO 2015-011937 | A1 | 1/2015 |
| WO | WO 2019-098245 | A1 | 5/2016 |
| WO | WO 2018-047565 | A1 | 3/2018 |
| WO | WO 2018/164224 | A1 | 9/2018 |
| WO | WO 2019/009228 | A1 | 1/2019 |

OTHER PUBLICATIONS

Jingjing Wang et al., “Structural, elastic, electronic and optical properties of lithium halides (LIF, LiCl, LiBr, and LiI): First-principle calculations”, Materials Chemistry and Physics 244 (2020) 122733.

Feipeng Zhao et al., “A Versatile Sn-Substituted Argyrodite Sulfide Electrolyte for All-Solid-State Li Metal Batteries”, Adv. Energy Mater. 10, 1903422 (2020).

Yizhou Zhu et al., “Origin of Outstanding Stability in the Lithium Solid ElectrolyteMaterials: Insights from Thermodynamic Analyses Based on First-Principles Calculations”, ACS Appl. Mater. Interfaces 7, 23685 (2015).

International Search Report dated Oct. 12, 2021 for PCT/KR2021/007845.

European Search Report dated Dec. 18, 2024.

Kinose, et al., Development of Lithium Sulfide for Solid Electrolyte, Creative (Technical Report), Nippon Chemical Industrial Co.,Ltd., No. 8 (2007), p. 33-39.

JP Office action dated May 27, 2024, for corresponding JP Application No. 2023-519535.

Third Party Observation dated Mar. 11, 2024, for corresponding JP Application No. 2023-519535.

* cited by examiner

SOLID ION CONDUCTOR COMPOUND, SOLID ELECTROLYTE COMPRISING SAME, ELECTROCHEMICAL CELL COMPRISING SAME, AND MANUFACTURING METHOD THEREOF

CROSS REFERENCE TO RELATED APPLICATIONS

This is the U.S. national phase application based on PCT/KR2021/007845 filed Jun. 22, 2021, which is based on Korean Patent Application No. 10-2020-0127521 filed on Sep. 29, 2020, the entire contents of all of which are hereby incorporated by reference.

TECHNICAL FIELD

The present invention relates to a solid ion conductor compound, a solid electrolyte including the same, a lithium battery including the same, and a method of manufacturing the same.

BACKGROUND ART

An all-solid lithium battery includes a solid electrolyte as an electrolyte. An all-solid lithium battery does not include a flammable organic solvent, and thus has excellent stability.

Solid electrolyte materials in the art are not sufficiently stable to a lithium metal. Also, the ionic conductivity of solid electrolytes in the art is lower than that of liquid substituents.

DESCRIPTION OF EMBODIMENTS

Technical Problem

One aspect is to provide a solid ion conductor compound with excellent lithium-ion conductivity and excellent softness by providing a new composition and a new crystal structure.

Solution to Problem

According to one aspect, a solid ion conductor compound represented by Formula 1 and having an argyrodite crystal structure is provided:

$$Li_aM_xT_yP_bS_cCl_dX_e \quad \text{Formula 1}$$

wherein, in Formula 1,

M may be Na, K, Rb, Cs, Fr, or a combination thereof,

T may be Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X may be Br, I, or a combination thereof, and $4<a<7$, $0<x<1$, $0\leq y<1$, $0<b\leq 1$, $4<c\leq 5$, $1\leq d+e<2$, and $1\leq d/e$.

According to another aspect, a solid electrolyte including the solid ion conductor compound is provided.

According to another aspect, an electrochemical cell including: a positive electrode layer including a positive electrode active material layer; a negative electrode layer including a negative electrode active material layer; and an electrolyte layer disposed between the positive electrode layer and the negative electrode layer; and the solid ion conductor compound is provided.

According to another aspect, a method of manufacturing a solid ion conductor compound is provided, the method including: contacting a compound including lithium, a compound including the element of Na, K, Rb, Cs, Fr, or a combination thereof, a compound including phosphorus (P), a compound including chlorine (Cl), and a compound including at least one of elements of Br and I, to provide a mixture; and performing heat treatment on the mixture in an inert atmosphere to provide a solid ion conductor compound.

Advantageous Effects of Disclosure

According to one aspect, by including a solid ion conductor compound having improved properties in terms of lithium-ion conductivity, softness, and stability to lithium metal, an electrochemical cell having high density, improved stability and improved cycle characteristics is provided.

Figure 1:
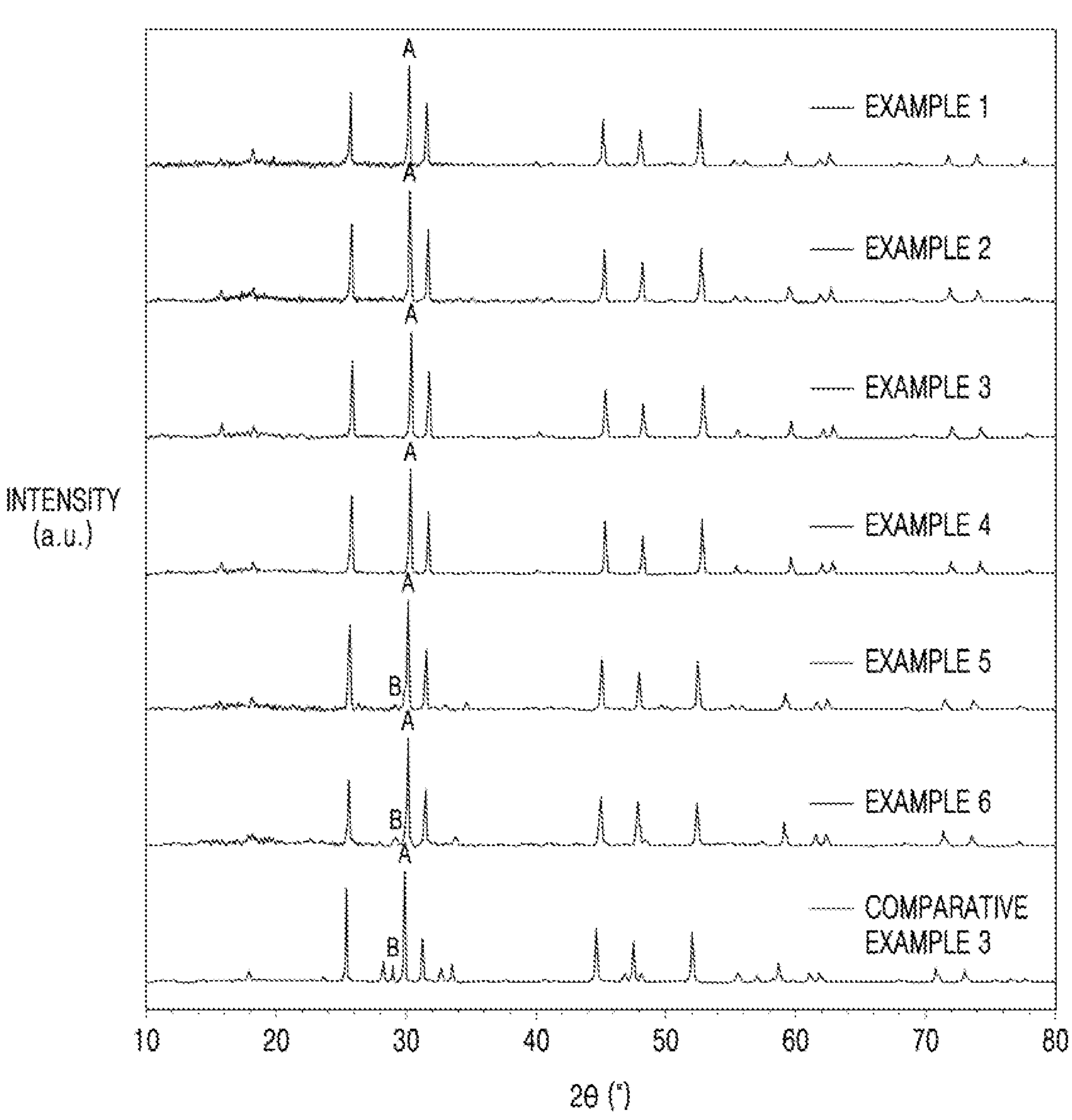
FIG. 1 shows an X-ray diffraction (XRD) spectrum of powders of solid ion conductor compounds prepared in Examples 1 to 6 and Comparative Example 3.

| ELEMENTS OF THE DRAWINGS | |
|---|---|
| 1, 1a: All-solid secondary battery | 10: Positive electrode |
| 11: Positive current collector | 12: Positive active material layer |
| 20: Negative electrode | 21: Negative current collector |
| 22: Negative active material layer | 23: Metal layer |
| 30: Solid electrolyte layer | 40: All-solid secondary battery |

MODE FOR INVENTION

Various embodiments are shown in the accompanying drawings. However, the present inventive idea may be embodied in many different forms and should not be construed as being limited to the implementations described herein. Rather, these embodiments are provided so that the present disclosure will be thorough and complete, and will fully convey the scope of the inventive idea to those skilled in the art. Like reference numerals designate like components.

It will be understood that when an element is referred to as being "on" another element, it may be directly on top of the other element, or another element may be interposed therebetween. In contrast, when an element is referred to as being "directly on" another element, there is no intervening element between them.

Although the terms "first," "second," "third," and the like may be used herein to describe various components, components, regions, layers, and/or regions, these components, components, regions, A layer and/or region should not be limited by these terms. These terms are only used to distinguish one element, component, region, layer or region from another element, component, region, layer or region. Thus, a first component, ingredient, region, layer, or area described below could be termed a second component, ingredient, region, layer, or area without departing from the teachings herein.

Terms used herein are for the purpose of describing specific embodiments, and are not intended to limit the present inventive idea. As used herein, the singular form is intended to include the plural form including "at least one" unless the context clearly dictates otherwise. "At least one" should not be construed as limiting to the singular. As used herein, the term "and/or" includes any and all combinations of one or more of the listed items. The terms "comprises" and/or "comprising" as used in the detailed description specify the presence of specified features, regions, integers, steps, operations, components, and/or ingredients, and one or more other features, regions, integers, steps, operations, components, and/or ingredients. However, it does not exclude the presence or addition thereof.

Spatially relative terms, such as "beneath," "below," "lower," "top," "above;" "upper," etc., can be used to facilitate describing the relationship of one component or feature to another component or feature. It will be understood that spatially relative terms are intended to include different orientations of a device in use or operation in addition to the orientations shown in drawings. For example, when a device in drawings is turned over, elements described as "beneath" or "bottom" other elements or features will be oriented "above" the other elements or features. Thus, the exemplary term "below" can encompass both directions of up and down. A device may be positioned in other orientations (rotated 90 degrees or rotated in other directions), and the spatially relative terms used herein interpreted accordingly.

Unless otherwise defined, all terms (including technical and scientific terms) used in the present specification have the same meaning as commonly understood by those skilled in the art to which the disclosure belongs to. In addition, terms such as terms defined in commonly used dictionaries should be interpreted to have meanings consistent with the meaning in the related art and the disclosure, and should not be construed as being idealized.

Exemplary embodiments are described with reference to cross-sectional views that are schematic diagrams of idealized embodiments. As such, variations from the illustrated shape should be expected as a result of, for example, manufacturing techniques and/or tolerances. Thus, the embodiments described herein should not be construed as being limited to the specific shapes of regions as shown herein, but should include deviations in shapes resulting, for example, from manufacturing. For example, regions illustrated or described as flat regions may generally have rough and/or non-linear characteristics. Moreover, the angles shown as sharp may be round. Therefore, regions illustrated in drawings are schematic in nature, and shapes thereof are not intended to illustrate the precise shape of the regions and are not intended to limit the scope of the claims.

The "Group" means a group of the Periodic Table of Elements according to the 1 to 18 grouping system of the International Union of Pure and Applied Chemistry ("IUPAC").

While particular embodiments have been described, currently unforeseen or unforeseeable alternatives, modifications, variations, improvements, and substantial equivalents may occur to applicants or those skilled in the art. Accordingly, the appended claims as filed and as may be amended are intended to embrace all such alternatives, modifications, variations, improvements and substantial equivalents.

Hereinafter, a solid ion conductor compound according to one or more exemplary embodiments, a solid electrolyte including the same, an electrochemical cell including the same, and a method for preparing the solid ion conductor compound will be described in more detail.

[Solid Ion Conductor Compound]

A solid ion conductor compound according to an embodiment may be represented by Formula 1 and have a an argyrodite crystal structure:

$$Li_aM_xT_yP_bS_cCl_dX_e \quad \text{Formula 1}$$

wherein, in Formula 1,

M may be Na, K, Rb, Cs, Fr, or a combination thereof,

T may be Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb, Bi, or a combination thereof, X may be Br, I, or a combination thereof, and $4<a<7$, $0<x<1$, $0\leq y<1$, $0<b\leq 1$, $4<c\leq 5$, $1\leq d+e<2$, and $1\leq d/e$.

In an embodiment, M in Formula 1 may substitute a part of Li in the crystal, and x may satisfy the condition of $0<x\leq 0.5$.

In an embodiment, a halogen element of Cl and X may substitute a part of an element S in the crystal.

The compound represented by Formula 1 is a crystalline compound having an argyrodite-type crystal structure. Since a part of Li in the crystal structure is substituted with an element M having a larger particle diameter than Li, and two or more halogen elements of Cl and X (e.g., Br and/or I) substitute a part of S, the disorder of the halogen element may increase, and thus the ionic conductivity and softness of the compound represented by Formula 1 may be improved.

When a part of Li in the crystal structure is substituted with an element M, such as Na, having a larger ion radius than Li, the crystal lattice volume may increase so that the resistance upon the movement of Li ions in the crystal may decrease, and when the element S (oxidation number: −2) in the crystal is substituted with the halogen element (oxidation number: −1), the ratio of Li ions that can move in the crystal may increase so that the lithium ionic conductivity may be improved.

In the case of the argyrodite-type solid electrolyte known in the art including only a Cl element for a halogen element, the contact with materials of an active material layer is poor, resulting in voids in the active material layer, and such voids act as a resistance layer for Li ions so that problems of degrading the ionic conductivity and cell life characteristics may occur. However, the aforementioned compound represented by Formula 1 into which Cl and one or more halogen elements different from Cl are introduced has increased softness, and thus the contact with materials of an active material layer is improved, enabling the production of a dense active material layer, so that the lithium-ion conductivity and cell lifespan characteristics may be improved. In addition, when a part of S is substituted with halogen, an amount of $H_2S$ harmful gas in the atmosphere may be reduced.

In an embodiment, y may satisfy the condition of $0 \le y < 0.5$.

The compound represented by Formula 1 may have improved moisture stability when a part of P is substituted with an element T. The element T, such as Ge, is an inorganic element and has stability to moisture, and thus the structural collapse of the compound in the atmosphere may be suppressed, thereby improving storage stability and processability.

In an embodiment, d+e may satisfy the condition of $1.3 \le d+e < 2$. In one or more embodiments, d+e may satisfy the condition of $1.35 \le d+e < 2$.

In an embodiment, d/e may satisfy the condition of $1 \le d/e < 18$. In one or more embodiments, d/e may satisfy the condition of $1 \le d/e \le 16$.

When d and e values satisfy the equation above, the ionic conductivity may be improved without precipitation of impurities, thereby improving the cell cycle characteristics.

In an embodiment, in the solid ion conductor compound, a ratio ($I_B/I_A$) of peak intensity ($I_B$) at diffraction angle $(2\theta)=29.07° \pm 0.5°$ to a peak intensity ($I_A$) at $2\theta=30.09° \pm 0.5°$, i.e., $I_B/I_A$, may satisfy the condition of $I_B/I_A < 0.15$ in an X-ray diffraction (XRD) spectrum using CuKα rays. For example, the ratio $I_B/I_A$ may satisfy the condition of $I_B/I_A \le 0.1$.

The $I_A$ peak refers to a main peak of the argyrodite-type crystal, and the $I_B$ peak refers to an impurity peak due to the element Br. In the case of $I_B/I_A < 0.15$, the improvement in ionic conductivity can be expected, whereas, in the case of $I_B/I_A \ge 0.15$, impurities act as a resistance to the movement of Li ions so that the lithium-ion conductivity is degraded.

In an embodiment, the solid ion conductor compound represented by Formula 1 may be represented by Formula 2:

$$(Li_{1-x1}M1_{x1})_{7+\alpha-\beta}(P_{1-y1}T1_{y1})_{\alpha}S_{6-\beta}(Cl_{1-e1}X1_{e1})_{\beta} \quad \text{Formula 2}$$

wherein, in Formula 2,

M1 may be Na, K, Rb, Cs, Fr, or a combination thereof,

T1 may be Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X1 may be Br, I, or a combination thereof, and $0<x1<1$, $0 \le y1 < 1$, $0 < e1 \le 0.5$, $0 < \alpha \le 1$, and $0 < \beta \le 2$.

In Formula 2, M1, T1, and X1 are defined by referring to M, T, and X described herein, respectively.

In an embodiment, M1 may include Na, K, or a combination thereof.

In an embodiment, y1 may satisfy the condition of $0 < y1 \le 0.5$, and T1 may include Ge, Si, or a combination thereof. For example, T1 may be Ge.

In an embodiment, X1 may be Br or I. For example, X1 may be Br.

In an embodiment, β may satisfy the condition of $1 \le \beta \le 2$.

In an embodiment, the solid ion conductor compound may be $(Li_{1-x1}Na_{x1})_{7-\beta}PS_{6-\beta}(Cl_{1-e1}I_{e1})_{\beta}$, $(Li_{1-x1}Na_{x1})_{7-\beta}PS_{6-\beta}(Cl_{1-e1}Br_{e1})_{\beta}$, $(Li_{1-x1}K_{x1})_{7-\beta}PS_{6-\beta}(Cl_{1-e1}I_{e1})_{\beta}$, $(Li_{1-x1}K_{x1})_{7-\beta}PS_{6-\beta}(Cl_{1-e1}Br_{e1})_{\beta}$, $(Li_{1-x1}Rb_{x1})_{7-\beta}PS_{6-\beta}(Cl_{1-e1}I_{e1})_{\beta}$, $(Li_{1-x1}Rb_{x1})_{7-\beta}PS_{6-\beta}(Cl_{1-e1}Br_{e1})_{\beta}$, $(Li_{1-x1}Cs_{x1})_{7-\beta}PS_{6-\beta}(Cl_{1-e1}I_{e1})_{\beta}$, $(Li_{1-x1}Cs_{x1})_{7-\beta}PS_{6-\beta}(Cl_{1-e1}Br_{e1})_{\beta}$, $(Li_{1-x1}Fr_{x1})_{7-\beta}PS_{6-\beta}(Cl_{1-e1}I_{e1})_{\beta}$, or $(Li_{1-x1}Fr_{x1})_{7-\beta}PS_{6-\beta}(Cl_{1-e1}Br_{e1})_{\beta}$, wherein $0<x1<1$, $0<e1 \le 0.5$, and $0<\beta \le 2$.

In an embodiment, the solid ion conductor compound may be $(Li_{1-x1}Na_{x1})_{7+\alpha-\beta}(P_{1-y1}Ge_{y1})_{\alpha}S_{6-62}$ $(Cl_{1-e1}I_{e1})_{\beta}$, $(Li_{1-x1}Na_{x1})_{7+\alpha-\beta}(P_{1-y1}Ge_{y1})\alpha S_{6-\beta}(Cl_{1-e1}Br_{e1})_{\beta}$, $(Li_{1-x1}K_{x1})_{7+\alpha-\beta}(P_{1-y1}Ge_{y1})\alpha S_{6-\beta}(Cl_{1-e1}I_{e1})_{\beta}$, $(Li_{1-x1}K_{x1})_{7+\alpha-\beta}(P_{1-y1}Ge_{y1})\alpha S_{6-\beta}(Cl_{1-e1}Br_{e1})_{\beta}$, $(Li_{1-x1}Rb_{x1})_{7+\alpha-\beta}(P_{1-y1}Ge_{y1})\alpha S_{6-\beta}(Cl_{1-e1}I_{e1})_{\beta}$, $(Li_{1-x1}Rb_{x1})_{7+\alpha-\beta}(P_{1-y1}Ge_{y1})\alpha S_{6-\beta}(Cl_{1-e1}Br_{e1})_{\beta}$, $(Li_{1-x1}Cs_{x1})_{7+\alpha-\beta}(P_{1-y1}Ge_{y1})\alpha S_{6-\beta}(Cl_{1-e1}I_{e1})_{\beta}$, $(Li_{1-x1}Cs_{x1})_{7+\alpha-\beta}(P_{1-y1}Ge_{y1})\alpha S_{6-\beta}(Cl_{1-e1}Br_{e1})_{\beta}$, $(Li_{1-x1}Fr_{x1})_{7+\alpha-\beta}(P_{1-y1}Ge_{y1})\alpha S_{6-\beta}(Cl_{1-e1}I_{e1})_{\beta}$, $(Li_{1-x1}Fr_{x1})_{7+\alpha-\beta}(P_{1-y1}Ge_{y1})\alpha S_{6-\beta}(Cl_{1-e1}Br_{e1})_{\beta}$, $(Li_{1-x1}Na_{x1})_{7+\alpha-\beta}(P_{1-y1}Si_{y1})\alpha S_{6-\beta}(Cl_{1-e1}I_{e1})_{\beta}$, $(Li_{1-x1}Na_{x1})_{7+\alpha-\beta}(P_{1-y1}Si_{y1})\alpha S_{6-\beta}(Cl_{1-e1}Br_{e1})_{\beta}$, $(Li_{1-x1}K_{x1})_{7+\alpha-\beta}(P_{1-y1}Si_{y1})\alpha S_{6-\beta}(Cl_{1-e1}I_{e1})_{\beta}$, $(Li_{1-x1}K_{x1})_{7+\alpha-\beta}(P_{1-y1}Si_{y1})\alpha S_{6-\beta}(Cl_{1-e1}Br_{e1})_{\beta}$, $(Li_{1-x1}Rb_{x1})_{7+\alpha-\beta}(P_{1-y1}Si_{y1})\alpha S_{6-\beta}(Cl_{1-e1}I_{e1})_{\beta}$, $(Li_{1-x1}Rb_{x1})_{7+\alpha-\beta}(P_{1-y1}Si_{y1})\alpha S_{6-\beta}(Cl_{1-e1}Br_{e1})_{\beta}$, $(Li_{1-x1}Cs_{x1})_{7+\alpha-\beta}(P_{1-y1}Si_{y1})\alpha S_{6-\beta}(Cl_{1-e1}I_{e1})_{\beta}$, $(Li_{1-x1}Cs_{x1})_{7+\alpha-\beta}(P_{1-y1}Si_{y1})\alpha S_{6-\beta}(Cl_{1-e1}Br_{e1})_{\beta}$, $(Li_{1-x1}Fr_{x1})_{7+\alpha-\beta}(P_{1-y1}Si_{y1})\alpha S_{6-\beta}(Cl_{1-e1}I_{e1})_{\beta}$, $(Li_{1-x1}Fr_{x1})_{7+\alpha-\beta}(P_{1-y1}Si_{y1})\alpha S_{6-\beta}(Cl_{1-e1}Br_{e1})_{\beta}$, $(Li_{1-x1}Na_{x1})_{7+\alpha-\beta}(P_{1-y1}Sc_{y1})\alpha S_{6-\beta}(Cl_{1-e1}I_{e1})_{\beta}$, $(Li_{1-x1}Na_{x1})_{7+\alpha-\beta}(P_{1-y1}Sc_{y1})\alpha S_{6-\beta}(Cl_{1-e1}Br_{e1})_{\beta}$, $(Li_{1-x1}K_{x1})_{7+\alpha-\beta}(P_{1-y1}Sc_{y1})\alpha S_{6-\beta}(Cl_{1-e1}I_{e1})_{\beta}$, $(Li_{1-x1}K_{x1})_{7+\alpha-\beta}(P_{1-y1}Sc_{y1})\alpha S_{6-\beta}(Cl_{1-e1}Br_{e1})_{\beta}$, $(Li_{1-x1}Rb_{x1})_{7+\alpha-\beta}(P_{1-y1}Sc_{y1})\alpha S_{6-\beta}(Cl_{1-e1}I_{e1})_{\beta}$, $(Li_{1-x1}Rb_{x1})_{7+\alpha-\beta}(P_{1-y1}Sc_{y1})\alpha S_{6-\beta}(Cl_{1-e1}Br_{e1})_{\beta}$, $(Li_{1-x1}Cs_{x1})_{7+\alpha-\beta}(P_{1-y1}Sc_{y1})\alpha S_{6-\beta}(Cl_{1-e1}I_{e1})_{\beta}$, $(Li_{1-x1}Cs_{x1})_{7+\alpha-\beta}(P_{1-y1}Sc_{y1})\alpha S_{6-\beta}(Cl_{1-e1}Br_{e1})_{\beta}$, $(Li_{1-x1}Fr_{x1})_{7+\alpha-\beta}(P_{1-y1}Sc_{y1})\alpha S_{6-\beta}(Cl_{1-e1}I_{e1})_{\beta}$, $(Li_{1-x1}Fr_{x1})_{7+\alpha-\beta}(P_{1-y1}Sc_{y1})\alpha S_{6-\beta}(Cl_{1-e1}Br_{e1})_{\beta}$, $(Li_{1-x1}Na_{x1})_{7+\alpha-\beta}(P_{1-y1}Y_{y1})_{\alpha}S_{6-\beta}(Cl_{1-e1}I_{e1})_{\beta}$, $(Li_{1-x1}Na_{x1})_{7+\alpha-\beta}(P_{1-y1}Y_{y1})_{\alpha}S_{6-\beta}(Cl_{1-e1}Br_{e1})_{\beta}$, $(Li_{1-x1}K_{x1})_{7+\alpha-\beta}(P_{1-y1}Y_{y1})_{\alpha}S_{6-\beta}(Cl_{1-e1}I_{e1})_{\beta}$, $(Li_{1-x1}K_{x1})_{7+\alpha-\beta}(P_{1-y1}Y_{y1})_{\alpha}S_{6-\beta}(Cl_{1-e1}Br_{e1})_{\beta}$, $(Li_{1-x1}Rb_{x1})_{7+\alpha-\beta}(P_{1-y1}Y_{y1})_{\alpha}S_{6-\beta}(Cl_{1-e1}I_{e1})_{\beta}$, $(Li_{1-x1}Rb_{x1})_{7+\alpha-\beta}(P_{1-y1}Y_{y1})_{\alpha}S_{6-\beta}(Cl_{1-e1}Br_{e1})_{\beta}$, $(Li_{1-x1}Cs_{x1})_{7+\alpha-\beta}(P_{1-y1}Y_{y1})\alpha S_{6-\beta}(Cl_{1-e1}I_{e1})_{\beta}$, $(Li_{1-x1}Cs_{x1})_{7+\alpha-\beta}(P_{1-y1}Y_{y1})\alpha S_{6-\beta}(Cl_{1-e1}Br_{e1})_{\beta}$, $(Li_{1-x1}Fr_{x1})_{7+\alpha-\beta}(P_{1-y1}Y_{y1})_{\alpha}S_{6-\beta}(Cl_{1-e1}I_{e1})_{\beta}$, $(Li_{1-x1}Fr_{x1})_{7+\alpha-\beta}(P_{1-y1}Y_{y1})_{\alpha}S_{6-\beta}(Cl_{1-e1}Br_{e1})_{\beta}$, $(Li_{1-x1}Na_{x1})_{7+\alpha-\beta}(P_{1-y1}Ti_{y1})\alpha S_{6-\beta}(Cl_{1-e1}I_{e1})_{\beta}$, $(Li_{1-x1}Na_{x1})_{7+\alpha-\beta}(P_{1-y1}Ti_{y1})\alpha S_{6-\beta}(Cl_{1-e1}Br_{e1})_{\beta}$, $(Li_{1-x1}K_{x1})_{7+\alpha-\beta}(P_{1-y1}Ti_{y1})\alpha S_{6-\beta}(Cl_{1-e1}I_{e1})_{\beta}$, $(Li_{1-x1}K_{x1})_{7+\alpha-\beta}(P_{1-y1}Ti_{y1})\alpha S_{6-\beta}(Cl_{1-e1}Br_{e1})_{\beta}$, $(Li_{1-x1}Rb_{x1})_{7+\alpha-\beta}(P_{1-y1}Ti_{y1})\alpha S_{6-\beta}(Cl_{1-e1}I_{e1})_{\beta}$, $(Li_{1-x1}Rb_{x1})_{7+\alpha-\beta}(P_{1-y1}Ti_{y1})\alpha S_{6-\beta}(Cl_{1-e1}Br_{e1})_{\beta}$, $(Li_{1-x1}Cs_{x1})_{7+\alpha-\beta}(P_{1-y1}Ti_{y1})_{\alpha}S_{6-\beta}(Cl_{1-e1}I_{e1})_{\beta}$, $(Li_{1-x1}Cs_{x1})_{7+\alpha-\beta}(P_{1-y1}Ti_{y1})_{\alpha}S_{6-\beta}(Cl_{1-e1}Br_{e1})_{\beta}$, $(Li_{1-x1}Fr_{x1})_{7+\alpha-\beta}(P_{1-y1}Ti_{y1})_{\alpha}S_{6-\beta}(Cl_{1-e1}I_{e1})_{\beta}$, $(Li_{1-x1}Fr_{x1})_{7+\alpha-\beta}(P_{1-y1}Ti_{y1})_{\alpha}S_{6-\beta}(Cl_{1-e1}Br_{e1})_{\beta}$, $(Li_{1-x1}Na_{x1})_{7+\alpha-\beta}(P_{1-y1}Zr_{y1})_{\alpha}S_{6-\beta}(Cl_{1-e1}I_{e1})_{\beta}$, $(Li_{1-x1}Na_{x1})_{7+\alpha-\beta}(P_{1-y1}Zr_{y1})_{\alpha}S_{6-\beta}(Cl_{1-e1}Br_{e1})_{\beta}$, $(Li_{1-x1}K_{x1})_{7+\alpha-\beta}(P_{1-y1}Zr_{y1})\alpha S_{6-\beta}(Cl_{1-e1}I_{e1})_{\beta}$, $(Li_{1-x1}K_{x1})_{7+\alpha-\beta}(P_{1-y1}Zr_{y1})\alpha S_{6-\beta}(Cl_{1-e1}Br_{e1})_{\beta}$, $(Li_{1-x1}Rb_{x1})_{7+\alpha-\beta}(P_{1-y1}Zr_{y1})_{\alpha}S_{6-\beta}(Cl_{1-e1}I_{e1})_{\beta}$, $(Li_{1-x1}Rb_{x1})_{7+\alpha-\beta}(P_{1-y1}Zr_{y1})\alpha S_{6-\beta}(Cl_{1-e1}Br_{e1})_{\beta}$, $(Li_{1-x1}Cs_{x1})_{7+\alpha-\beta}(P_{1-y1}Zr_{y1})_{\alpha}S_{6-\beta}(Cl_{1-e1}I_{e1})_{\beta}$, $(Li_{1-x1}Cs_{x1})_{7+\alpha-\beta}(P_{1-y1}Zr_{y1})_{\alpha}S_{6-\beta}(Cl_{1-e1}Br_{e1})_{\beta}$, $(Li_{1-x1}Fr_{x1})_{7+\alpha-\beta}(P_{1-y1}Zr_{y1})\alpha S_{6-\beta}(Cl_{1-e1}I_{e1})_{\beta}$, $(Li_{1-x1}Fr_{x1})_{7+\alpha-\beta}(P_{1-y1}Zr_{y1})\alpha S_{6-\beta}(Cl_{1-e1}Br_{e1})_{\beta}$, $(Li_{1-x1}Na_{x1})_{7+\alpha-\beta}(P_{1-y1}Hf_{y1})\alpha S_{6-\beta}(Cl_{1-e1}I_{e1})_{\beta}$, $(Li_{1-x1}Na_{x1})_{7+\alpha-\beta}(P_{1-y1}Hf_{y1})\alpha S_{6-\beta}(Cl_{1-e1}Br_{e1})_{\beta}$, $(Li_{1-x1}K_{x1})_{7+\alpha-\beta}(P_{1-y1}Hf_{y1})\alpha S_{6-\beta}(Cl_{1-e1}I_{e1})_{\beta}$, $(Li_{1-x1}K_{x1})_{7+\alpha-\beta}(P_{1-y1}Hf_{y1})\alpha S_{6-\beta}(Cl_{1-e1}Br_{e1})_{\beta}$, $(Li_{1-x1}Rb_{x1})_{7+\alpha-\beta}(P_{1-y1}Hf_{y1})\alpha S_{6-\beta}(Cl_{1-e1}I_{e1})_{\beta}$, $(Li_{1-x1}Rb_{x1})_{7+\alpha-\beta}(P_{1-y1}Hf_{y1})\alpha S_{6-\beta}(Cl_{1-e1}Br_{e1})_{\beta}$, $(Li_{1-x1}Cs_{x1})_{7+\alpha-\beta}(P_{1-y1}Hf_{y1})\alpha S_{6-\beta}(Cl_{1-e1}I_{e1})_{\beta}$, $(Li_{1-x1}Cs_{x1})_{7+\alpha-\beta}(P_{1-y1}Hf_{y1})\alpha S_{6-\beta}(Cl_{1-e1}Br_{e1})_{\beta}$, (Li$_{1-x1}$ $Fr_{x1})_{7+\alpha-\beta}(P_{1-y1}Hf_{y1})\alpha S_{6-\beta}(Cl_{1-e1}I_{e1})_{\beta}$, $(Li_{1-x1}Fr_{x1})_{7+\alpha-\beta}(P_{1-y1}Hf_{y1})\alpha S_{6-\beta}(Cl_{1-e1}Br_{e1})_{\beta}$,
$(Li_{1-x1}Na_{x1})_{7+\alpha-\beta}(P_{1-y1}V_{y1})\alpha S_{6-\beta}(Cl_{1-e1}I_{e1})_{\beta}$,
$(Li_{1-x1}Na_{x1})_{7+\alpha-\beta}(P_{1-y1}V_{y1})\alpha S_{6-\beta}(Cl_{1-e1}Br_{e1})_{\beta}$,
$(Li_{1-x1}K_{x1})_{7+\alpha-\beta}(P_{1-y1}V_{y1})\alpha S_{6-\beta}(Cl_{1-e1}I_{e1})_{\beta}$,
$(Li_{1-x1}K_{x1})_{7+\alpha-\beta}(P_{1-y1}V_{y1})\alpha S_{6-\beta}(Cl_{1-e1}Br_{e1})_{\beta}$,
$(Li_{1-x1}Rb_{x1})_{7+\alpha-\beta}(P_{1-y1}V_{y1})\alpha S_{6-\beta}(Cl_{1-e1}I_{e1})_{\beta}$,
$(Li_{1-x1}Rb_{x1})_{7+\alpha-\beta}(P_{1-y1}V_{y1})\alpha S_{6-\beta}(Cl_{1-e1}Br_{e1})_{\beta}$,
$(Li_{1-x1}Cs_{x1})_{7+\alpha-\beta}(P_{1-y1}V_{y1})\alpha S_{6-\beta}(Cl_{1-e1}I_{e1})_{\beta}$,
$(Li_{1-x1}Cs_{x1})_{7+\alpha-\beta}(P_{1-y1}V_{y1})\alpha S_{6-\beta}(Cl_{1-e1}Br_{e1})_{\beta}$,
$(Li_{1-x1}Fr_{x1})_{7+\alpha-\beta}(P_{1-y1}V_{y1})\alpha S_{6-\beta}(Cl_{1-e1}I_{e1})_{\beta}$,
$(Li_{1-x1}Fr_{x1})_{7+\alpha-\beta}(P_{1-y1}V_{y1})\alpha S_{6-\beta}(Cl_{1-e1}Br_{e1})_{\beta}$,
$(Li_{1-x1}Na_{x1})_{7+\alpha-\beta}(P_{1-y1}Nb_{y1})\alpha S_{6-\beta}(Cl_{1-e1}I_{e1})_{\beta}$,
$(Li_{1-x1}Na_{x1})_{7+\alpha-\beta}(P_{1-y1}Nb_{y1})\alpha S_{6-\beta}(Cl_{1-e1}Br_{e1})_{\beta}$,
$(Li_{1-x1}K_{x1})_{7+\alpha-\beta}(P_{1-y1}Nb_{y1})\alpha S_{6-\beta}(Cl_{1-e1}I_{e1})_{\beta}$,
$(Li_{1-x1}K_{x1})_{7+\alpha-\beta}(P_{1-y1}Nb_{y1})\alpha S_{6-\beta}(Cl_{1-e1}Br_{e1})_{\beta}$,
$(Li_{1-x1}Rb_{x1})_{7+\alpha-\beta}(P_{1-y1}Nb_{y1})\alpha S_{6-\beta}(Cl_{1-e1}I_{e1})_{\beta}$,
$(Li_{1-x1}Rb_{x1})_{7+\alpha-\beta}(P_{1-y1}Nb_{y1})\alpha S_{6-\beta}(Cl_{1-e1}Br_{e1})_{\beta}$,
$(Li_{1-x1}Cs_{x1})_{7+\alpha-\beta}(P_{1-y1}Nb_{y1})\alpha S_{6-\beta}(Cl_{1-e1}I_{e1})_{\beta}$,
$(Li_{1-x1}Cs_{x1})_{7+\alpha-\beta}(P_{1-y1}Nb_{y1})\alpha S_{6-\beta}(Cl_{1-e1}Br_{e1})_{\beta}$,
$(Li_{1-x1}Fr_{x1})_{7+\alpha-\beta}(P_{1-y1}Nb_{y1})\alpha S_{6-\beta}(Cl_{1-e1}I_{e1})_{\beta}$,
$(Li_{1-x1}Fr_{x1})_{7+\alpha-\beta}(P_{1-y1}Nb_{y1})\alpha S_{6-\beta}(Cl_{1-e1}Br_{e1})_{\beta}$,
$(Li_{1-x1}Na_{x1})_{7+\alpha-\beta}(P_{1-y1}Ta_{y1})_{\alpha}S_{6-\beta}(Cl_{1-e1}I_{e1})_{\beta}$,
$(Li_{1-x1}Na_{x1})_{7+\alpha-\beta}(P_{1-y1}Ta_{y1})_{\alpha}S_{6-\beta}(Cl_{1-e1}Br_{e1})_{\beta}$,
$(Li_{1-x1}K_{x1})_{7+\alpha-\beta}(P_{1-y1}Ta_{y1})\alpha S_{6-\beta}(Cl_{1-e1}I_{e1})_{\beta}$,
$(Li_{1-x1}K_{x1})_{7+\alpha-\beta}(P_{1-y1}Ta_{y1})\alpha S_{6-\beta}(Cl_{1-e1}Br_{e1})_{\beta}$,
$(Li_{1-x1}Rb_{x1})_{7+\alpha-\beta}(P_{1-y1}Ta_{y1})\alpha S_{6-\beta}(Cl_{1-e1}I_{e1})_{\beta}$,
$(Li_{1-x1}Rb_{x1})_{7+\alpha-\beta}(P_{1-y1}Ta_{y1})\alpha S_{6-\beta}(Cl_{1-e1}Br_{e1})_{\beta}$,
$(Li_{1-x1}Cs_{x1})_{7+\alpha-\beta}(P_{1-y1}Ta_{y1})\alpha S_{6-\beta}(Cl_{1-e1}I_{e1})_{\beta}$,
$(Li_{1-x1}Cs_{x1})_{7+\alpha-\beta}(P_{1-y1}Ta_{y1})\alpha S_{6-\beta}(Cl_{1-e1}Br_{e1})_{\beta}$,
$(Li_{1-x1}Fr_{x1})_{7+\alpha-\beta}(P_{1-y1}Ta_{y1})\alpha S_{6-\beta}(Cl_{1-e1}I_{e1})_{\beta}$,
$(Li_{1-x1}Fr_{x1})_{7+\alpha-\beta}(P_{1-y1}Ta_{y1})\alpha S_{6-\beta}(Cl_{1-e1}Br_{e1})_{\beta}$,
$(Li_{1-x1}Na_{x1})_{7+\alpha-\beta}(P_{1-y1}Cr_{y1})\alpha S_{6-\beta}(Cl_{1-e1}I_{e1})_{\beta}$,
$(Li_{1-x1}Na_{x1})_{7+\alpha-\beta}(P_{1-y1}Cr_{y1})\alpha S_{6-\beta}(Cl_{1-e1}Br_{e1})_{\beta}$,
$(Li_{1-x1}K_{x1})_{7+\alpha-\beta}(P_{1-y1}Cr_{y1})\alpha S_{6-\beta}(Cl_{1-e1}I_{e1})_{\beta}$,
$(Li_{1-x1}K_{x1})_{7+\alpha-\beta}(P_{1-y1}Cr_{y1})\alpha S_{6-\beta}(Cl_{1-e1}Br_{e1})_{\beta}$,
$(Li_{1-x1}Rb_{x1})_{7+\alpha-\beta}(P_{1-y1}Cr_{y1})\alpha S_{6-\beta}(Cl_{1-e1}I_{e1})_{\beta}$,
$(Li_{1-x1}Rb_{x1})_{7+\alpha-\beta}(P_{1-y1}Cr_{y1})\alpha S_{6-\beta}(Cl_{1-e1}Br_{e1})_{\beta}$,
$(Li_{1-x1}Cs_{x1})_{7+\alpha-\beta}(P_{1-y1}Cr_{y1})\alpha S_{6-\beta}(Cl_{1-e1}I_{e1})_{\beta}$,
$(Li_{1-x1}Cs_{x1})_{7+\alpha-\beta}(P_{1-y1}Cr_{y1})\alpha S_{6-\beta}(Cl_{1-e1}Br_{e1})_{\beta}$,
$(Li_{1-x1}Fr_{x1})_{7+\alpha-\beta}(P_{1-y1}Cr_{y1})\alpha S_{6-\beta}(Cl_{1-e1}I_{e1})_{\beta}$,
$(Li_{1-x1}Fr_{x1})_{7+\alpha-\beta}(P_{1-y1}Cr_{y1})\alpha S_{6-\beta}(Cl_{1-e1}Br_{e1})_{\beta}$,
$(Li_{1-x1}Na_{x1})_{7+\alpha-\beta}(P_{1-y1}W_{y1})_{\alpha}S_{6-\beta}(Cl_{1-e1}I_{e1})_{\beta}$,
$(Li_{1-x1}Na_{x1})_{7+\alpha-\beta}(P_{1-y1}W_{y1})_{\alpha}S_{6-\beta}(Cl_{1-e1}Br_{e1})_{\beta}$,
$(Li_{1-x1}K_{x1})_{7+\alpha-\beta}(P_{1-y1}W_{y1})\alpha S_{6-\beta}(Cl_{1-e1}I_{e1})_{\beta}$,
$(Li_{1-x1}K_{x1})_{7+\alpha-\beta}(P_{1-y1}W_{y1})\alpha S_{6-\beta}(Cl_{1-e1}Br_{e1})_{\beta}$,
$(Li_{1-x1}Rb_{x1})_{7+\alpha-\beta}(P_{1-y1}W_{y1})\alpha S_{6-\beta}(Cl_{1-e1}I_{e1})_{\beta}$,
$(Li_{1-x1}Rb_{x1})_{7+\alpha-\beta}(P_{1-y1}W_{y1})\alpha S_{6-\beta}(Cl_{1-e1}Br_{e1})_{\beta}$,
$(Li_{1-x1}Cs_{x1})_{7+\alpha-\beta}(P_{1-y1}W_{y1})\alpha S_{6-\beta}(Cl_{1-e1}I_{e1})_{\beta}$,
$(Li_{1-x1}Cs_{x1})_{7+\alpha-\beta}(P_{1-y1}W_{y1})\alpha S_{6-\beta}(Cl_{1-e1}Br_{e1})_{\beta}$,
$(Li_{1-x1}Fr_{x1})_{7+\alpha-\beta}(P_{1-y1}W_{y1})\alpha S_{6-\beta}(Cl_{1-e1}I_{e1})_{\beta}$,
$(Li_{1-x1}Fr_{x1})_{7+\alpha-\beta}(P_{1-y1}W_{y1})\alpha S_{6-\beta}(Cl_{1-e1}Br_{e1})_{\beta}$,
$(Li_{1-x1}Na_{x1})_{7+\alpha-\beta}(P_{1-y1}W_{y1})\alpha S_{6-\beta}(Cl_{1-e1}I_{e1})_{\beta}$,
$(Li_{1-x1}Na_{x1})_{7+\alpha-\beta}(P_{1-y1}W_{y1})\alpha S_{6-\beta}(Cl_{1-e1}Br_{e1})_{\beta}$,
$(Li_{1-x1}K_{x1})_{7+\alpha-\beta}(P_{1-y1}W_{y1})\alpha S_{6-\beta}(Cl_{1-e1}I_{e1})_{\beta}$,
$(Li_{1-x1}K_{x1})_{7+\alpha-\beta}(P_{1-y1}W_{y1})\alpha S_{6-\beta}(Cl_{1-e1}Br_{e1})_{\beta}$,
$(Li_{1-x1}Rb_{x1})_{7+\alpha-\beta}(P_{1-y1}W_{y1})\alpha S_{6-\beta}(Cl_{1-e1}I_{e1})_{\beta}$,
$(Li_{1-x1}Rb_{x1})_{7+\alpha-\beta}(P_{1-y1}W_{y1})\alpha S_{6-\beta}(Cl_{1-e1}Br_{e1})_{\beta}$,
$(Li_{1-x1}Cs_{x1})_{7+\alpha-\beta}(P_{1-y1}W_{y1})\alpha S_{6-\beta}(Cl_{1-e1}I_{e1})_{\beta}$,
$(Li_{1-x1}Cs_{x1})_{7+\alpha-\beta}(P_{1-y1}W_{y1})\alpha S_{6-\beta}(Cl_{1-e1}Br_{e1})_{\beta}$,
$(Li_{1-x1}Fr_{x1})_{7+\alpha-\beta}(P_{1-y1}W_{y1})\alpha S_{6-\beta}(Cl_{1-e1}I_{e1})_{\beta}$,
$(Li_{1-x1}Fr_{x1})_{7+\alpha-\beta}(P_{1-y1}W_{y1})\alpha S_{6-\beta}(Cl_{1-e1}Br_{e1})_{\beta}$,
$(Li_{1-x1}Na_{x1})_{7+\alpha-\beta}(P_{1-y1}Mn_{y1})\alpha S_{6-\beta}(Cl_{1-e1}I_{e1})_{\beta}$,
$(Li_{1-x1}Na_{x1})_{7+\alpha-\beta}(P_{1-y1}Mn_{y1})\alpha S_{6-\beta}(Cl_{1-e1}Br_{e1})\beta$,
$(Li_{1-x1}K_{x1})_{7+\alpha-\beta}(P_{1-y1}Mn_{y1})_{\alpha}S_{6-\beta}(Cl_{1-e1}I_{e1})_{\beta}$,
$(Li_{1-x1}K_{x1})_{7+\alpha-\beta}(P_{1-y1}Mn_{y1})_{\alpha}S_{6-\beta}(Cl_{1-e1}Br_{e1})_{\beta}$,
$(Li_{1-x1}Rb_{x1})_{7+\alpha-\beta}(P_{1-y1}Mn_{y1})_{\alpha}S_{6-\beta}(Cl_{1-e1}I_{e1})_{\beta}$,
$(Li_{1-x1}Rb_{x1})_{7+\alpha-\beta}(P_{1-y1}Mn_{y1})_{\alpha}S_{6-\beta}(Cl_{1-e1}Br_{e1})_{\beta}$,
$(Li_{1-x1}Cs_{x1})_{7+\alpha-\beta}(P_{1-y1}Mn_{y1})_{\alpha}S_{6-\beta}(Cl_{1-e1}I_{e1})_{\beta}$,
$(Li_{1-x1}Cs_{x1})_{7+\alpha-\beta}(P_{1-y1}Mn_{y1})_{\alpha}S_{6-\beta}(Cl_{1-e1}Br_{e1})_{\beta}$,
$(Li_{1-x1}Fr_{x1})_{7+\alpha-\beta}(P_{1-y1}Mn_{y1})_{\alpha}S_{6-\beta}(Cl_{1-e1}I_{e1})_{\beta}$,
$(Li_{1-x1}Fr_{x1})_{7+\alpha-\beta}(P_{1-y1}Mn_{y1})_{\alpha}S_{6-\beta}(Cl_{1-e1}Br_{e1})_{\beta}$,
$(Li_{1-x1}Na_{x1})_{7+\alpha-\beta}(P_{1-y1}Tc_{y1})\alpha S_{6-\beta}(Cl_{1-e1}I_{e1})_{\beta}$,
$(Li_{1-x1}Na_{x1})_{7+\alpha-\beta}(P_{1-y1}Tc_{y1})\alpha S_{6-\beta}(Cl_{1-e1}Br_{e1})_{\beta}$,
$(Li_{1-x1}K_{x1})_{7+\alpha-\beta}(P_{1-y1}Tc_{y1})\alpha S_{6-\beta}(Cl_{1-e1}I_{e1})_{\beta}$,
$(Li_{1-x1}K_{x1})_{7+\alpha-\beta}(P_{1-y1}Tc_{y1})\alpha S_{6-\beta}(Cl_{1-e1}Br_{e1})_{\beta}$,
$(Li_{1-x1}Rb_{x1})_{7+\alpha-\beta}(P_{1-y1}Tc_{y1})\alpha S_{6-\beta}(Cl_{1-e1}I_{e1})_{\beta}$,
$(Li_{1-x1}Rb_{x1})_{7+\alpha-\beta}(P_{1-y1}Tc_{y1})\alpha S_{6-\beta}(Cl_{1-e1}Br_{e1})_{\beta}$,
$(Li_{1-x1}Cs_{x1})_{7+\alpha-\beta}(P_{1-y1}Tc_{y1})\alpha S_{6-\beta}(Cl_{1-e1}I_{e1})_{\beta}$,
$(Li_{1-x1}Cs_{x1})_{7+\alpha-\beta}(P_{1-y1}Tc_{y1})\alpha S_{6-\beta}(Cl_{1-e1}Br_{e1})_{\beta}$,
$(Li_{1-x1}Fr_{x1})_{7+\alpha-\beta}(P_{1-y1}Tc_{y1})\alpha S_{6-\beta}(Cl_{1-e1}I_{e1})_{\beta}$,
$(Li_{1-x1}Fr_{x1})_{7+\alpha-\beta}(P_{1-y1}Tc_{y1})\alpha S_{6-\beta}(Cl_{1-e1}Br_{e1})_{\beta}$,
$(Li_{1-x1}Na_{x1})_{7+\alpha-\beta}(P_{1-y1}Re_{y1})\alpha S_{6-\beta}(Cl_{1-e1}I_{e1})_{\beta}$,
$(Li_{1-x1}Na_{x1})_{7+\alpha-\beta}(P_{1-y1}Re_{y1})\alpha S_{6-\beta}(Cl_{1-e1}Br_{e1})_{\beta}$,
$(Li_{1-x1}K_{x1})_{7+\alpha-\beta}(P_{1-y1}Re_{y1})\alpha S_{6-\beta}(Cl_{1-e1}I_{e1})_{\beta}$,
$(Li_{1-x1}K_{x1})_{7+\alpha-\beta}(P_{1-y1}Re_{y1})\alpha S_{6-\beta}(Cl_{1-e1}Br_{e1})_{\beta}$,
$(Li_{1-x1}Rb_{x1})_{7+\alpha-\beta}(P_{1-y1}Re_{y1})\alpha S_{6-\beta}(Cl_{1-e1}I_{e1})_{\beta}$,
$(Li_{1-x1}Rb_{x1})_{7+\alpha-\beta}(P_{1-y1}Re_{y1})\alpha S_{6-\beta}(Cl_{1-e1}Br_{e1})_{\beta}$,
$(Li_{1-x1}Cs_{x1})_{7+\alpha-\beta}(P_{1-y1}Re_{y1})\alpha S_{6-\beta}(Cl_{1-e1}I_{e1})_{\beta}$,
$(Li_{1-x1}Cs_{x1})_{7+\alpha-\beta}(P_{1-y1}Re_{y1})\alpha S_{6-\beta}(Cl_{1-e1}Br_{e1})_{\beta}$,
$(Li_{1-x1}Fr_{x1})_{7+\alpha-\beta}(P_{1-y1}Re_{y1})\alpha S_{6-\beta}(Cl_{1-e1}I_{e1})_{\beta}$,
$(Li_{1-x1}Fr_{x1})_{7+\alpha-\beta}(P_{1-y1}Re_{y1})\alpha S_{6-\beta}(Cl_{1-e1}Br_{e1})_{\beta}$,
$(Li_{1-x1}Na_{x1})_{7+\alpha-\beta}(P_{1-y1}Fe_{y1})\alpha S_{6-\beta}(Cl_{1-e1}I_{e1})_{\beta}$,
$(Li_{1-x1}Na_{x1})_{7+\alpha-\beta}(P_{1-y1}Fe_{y1})\alpha S_{6-\beta}(Cl_{1-e1}Br_{e1})_{\beta}$,
$(Li_{1-x1}K_{x1})_{7+\alpha-\beta}(P_{1-y1}Fe_{y1})\alpha S_{6-\beta}(Cl_{1-e1}I_{e1})_{\beta}$,
$(Li_{1-x1}K_{x1})_{7+\alpha-\beta}(P_{1-y1}Fe_{y1})\alpha S_{6-\beta}(Cl_{1-e1}Br_{e1})_{\beta}$,
$(Li_{1-x1}Rb_{x1})_{7+\alpha-\beta}(P_{1-y1}Fe_{y1})\alpha S_{6-\beta}(Cl_{1-e1}I_{e1})_{\beta}$,
$(Li_{1-x1}Rb_{x1})_{7+\alpha-\beta}(P_{1-y1}Fe_{y1})\alpha S_{6-\beta}(Cl_{1-e1}Br_{e1})_{\beta}$,
$(Li_{1-x1}Cs_{x1})_{7+\alpha-\beta}(P_{1-y1}Fe_{y1})\alpha S_{6-\beta}(Cl_{1-e1}I_{e1})_{\beta}$,
$(Li_{1-x1}Cs_{x1})_{7+\alpha-\beta}(P_{1-y1}Fe_{y1})\alpha S_{6-\beta}(Cl_{1-e1}Br_{e1})_{\beta}$,
$(Li_{1-x1}Fr_{x1})_{7+\alpha-\beta}(P_{1-y1}Fe_{y1})\alpha S_{6-\beta}(Cl_{1-e1}I_{e1})_{\beta}$,
$(Li_{1-x1}Fr_{x1})_{7+\alpha-\beta}(P_{1-y1}Fe_{y1})\alpha S_{6-\beta}(Cl_{1-e1}Br_{e1})_{\beta}$,
$(Li_{1-x1}Na_{x1})_{7+\alpha-\beta}(P_{1-y1}Ru_{y1})\alpha S_{6-\beta}(Cl_{1-e1}I_{e1})_{\beta}$,
$(Li_{1-x1}Na_{x1})_{7+\alpha-\beta}(P_{1-y1}Ru_{y1})\alpha S_{6-\beta}(Cl_{1-e1}Br_{e1})_{\beta}$,
$(Li_{1-x1}K_{x1})_{7+\alpha-\beta}(P_{1-y1}Ru_{y1})\alpha S_{6-\beta}(Cl_{1-e1}I_{e1})_{\beta}$,
$(Li_{1-x1}K_{x1})_{7+\alpha-\beta}(P_{1-y1}Ru_{y1})\alpha S_{6-\beta}(Cl_{1-e1}Br_{e1})_{\beta}$,
$(Li_{1-x1}Rb_{x1})_{7+\alpha-\beta}(P_{1-y1}Ru_{y1})\alpha S_{6-\beta}(Cl_{1-e1}I_{e1})_{\beta}$,
$(Li_{1-x1}Rb_{x1})_{7+\alpha-\beta}(P_{1-y1}Ru_{y1})\alpha S_{6-\beta}(Cl_{1-e1}Br_{e1})_{\beta}$.
$(Li_{1-x1}Cs_{x1})_{7+\alpha-\beta}(P_{1-y1}Ru_{y1})_{\alpha}S_{6-\beta}(Cl_{1-e1}I_{e1})_{\beta}$,
$(Li_{1-x1}Cs_{x1})_{7+\alpha-\beta}(P_{1-y1}Ru_{y1})_{\alpha}S_{6-\beta}(Cl_{1-e1}Br_{e1})_{\beta}$,
$(Li_{1-x1}Fr_{x1})_{7+\alpha-\beta}(P_{1-y1}Ru_{y1})_{\alpha}S_{6-\beta}(Cl_{1-e1}I_{e1})_{\beta}$,
$(Li_{1-x1}Fr_{x1})_{7+\alpha-\beta}(P_{1-y1}Ru_{y1})_{\alpha}S_{6-\beta}(Cl_{1-e1}Br_{e1})_{\beta}$,
$(Li_{1-x1}Na_{x1})_{7+\alpha-\beta}(P_{1-y1}Os_{y1})_{\alpha}S_{6-\beta}(Cl_{1-e1}I_{e1})_{\beta}$,
$(Li_{1-x1}Na_{x1})_{7+\alpha-\beta}(P_{1-y1}Os_{y1})_{\alpha}S_{6-\beta}(Cl_{1-e1}Br_{e1})_{\beta}$,
$(Li_{1-x1}K_{x1})_{7+\alpha-\beta}(P_{1-y1}Os_{y1})_{\alpha}S_{6-\beta}(Cl_{1-e1}I_{e1})_{\beta}$,
$(Li_{1-x1}K_{x1})_{7+\alpha-\beta}(P_{1-y1}Os_{y1})_{\alpha}S_{6-\beta}(Cl_{1-e1}Br_{e1})_{\beta}$,
$(Li_{1-x1}Rb_{x1})_{7+\alpha-\beta}(P_{1-y1}Os_{y1})_{\alpha}S_{6-\beta}(Cl_{1-e1}I_{e1})_{\beta}$,
$(Li_{1-x1}Rb_{x1})_{7+\alpha-\beta}(P_{1-y1}Os_{y1})_{\alpha}S_{6-\beta}(Cl_{1-e1}Br_{e1})_{\beta}$,
$(Li_{1-x1}Cs_{x1})_{7+\alpha-\beta}(P_{1-y1}Os_{y1})_{\alpha}S_{6-\beta}(Cl_{1-e1}I_{e1})_{\beta}$,
$(Li_{1-x1}Cs_{x1})_{7+\alpha-\beta}(P_{1-y1}Os_{y1})_{\alpha}S_{6-\beta}(Cl_{1-e1}Br_{e1})_{\beta}$,
$(Li_{1-x1}Fr_{x1})_{7+\alpha-\beta}(P_{1-y1}Os_{y1})_{\alpha}S_{6-\beta}(Cl_{1-e1}I_{e1})_{\beta}$,
$(Li_{1-x1}Fr_{x1})_{7+\alpha-\beta}(P_{1-y1}Os_{y1})_{\alpha}S_{6-\beta}(Cl_{1-e1}Br_{e1})_{\beta}$,
$(Li_{1-x1}Na_{x1})_{7+\alpha-\beta}(P_{1-y1}Co_{y1})\alpha S_{6-\beta}(Cl_{1-e1}I_{e1})_{\beta}$,
$(Li_{1-x1}Na_{x1})_{7+\alpha-\beta}(P_{1-y1}Co_{y1})\alpha S_{6-\beta}(Cl_{1-e1}Br_{e1})_{\beta}$,
$(Li_{1-x1}K_{x1})_{7+\alpha-\beta}(P_{1-y1}Co_{y1})\alpha S_{6-\beta}(Cl_{1-e1}I_{e1})_{\beta}$,
$(Li_{1-x1}K_{x1})_{7+\alpha-\beta}(P_{1-y1}Co_{y1})\alpha S_{6-\beta}(Cl_{1-e1}Br_{e1})_{\beta}$,
$(Li_{1-x1}Rb_{x1})_{7+\alpha-\beta}(P_{1-y1}Co_{y1})_{\alpha}S_{6-\beta}(Cl_{1-e1}I_{e1})_{\beta}$,
$(Li_{1-x1}Rb_{x1})_{7+\alpha-\beta}(P_{1-y1}Co_{y1})\alpha S_{6-\beta}(Cl_{1-e1}Br_{e1})_{\beta}$,
$(Li_{1-x1}Cs_{x1})_{7+\alpha-\beta}(P_{1-y1}Co_{y1})\alpha S_{6-\beta}(Cl_{1-e1}I_{e1})_{\beta}$,
$(Li_{1-x1}Cs_{x1})_{7+\alpha-\beta}(P_{1-y1}Co_{y1})\alpha S_{6-\beta}(Cl_{1-e1}Br_{e1})_{\beta}$,
$(Li_{1-x1}Fr_{x1})_{7+\alpha-\beta}(P_{1-y1}Co_{y1})_{\alpha}S_{6-\beta}(Cl_{1-e1}I_{e1})_{\beta}$,
$(Li_{1-x1}Fr_{x1})_{7+\alpha-\beta}(P_{1-y1}Co_{y1})_{\alpha}S_{6-\beta}(Cl_{1-e1}Br_{e1})_{\beta}$,
$(Li_{1-x1}Na_{x1})_{7+\alpha-\beta}(P_{1-y1}Rh_{y1})\alpha S_{6-\beta}(Cl_{1-e1}I_{e1})_{\beta}$,
$(Li_{1-x1}Na_{x1})_{7+\alpha-\beta}(P_{1-y1}Rh_{y1})\alpha S_{6-\beta}(Cl_{1-e1}Br_{e1})_{\beta}$,
$(Li_{1-x1}K_{x1})_{7+\alpha-\beta}(P_{1-y1}Rh_{y1})\alpha S_{6-\beta}(Cl_{1-e1}I_{e1})_{\beta}$, $(Li_{1-x1}K_{x1})_{7+\alpha-\beta}(P_{1-y1}Rh_{y1})\alpha S_{6-\beta}(Cl_{1-e1}Br_{e1})_{\beta}$,
$(Li_{1-x1}Rb_{x1})_{7+\alpha-\beta}(P_{1-y1}Rh_{y1})\alpha S_{6-\beta}(Cl_{1-e1}I_{e1})_{\beta}$,
$(Li_{1-x1}Rb_{x1})_{7+\alpha-\beta}(P_{1-y1}Rh_{y1})\alpha S_{6-\beta}(Cl_{1-e1}Br_{e1})_{\beta}$,
$(Li_{1-x1}Cs_{x1})_{7+\alpha-\beta}(P_{1-y1}Rh_{y1})\alpha S_{6-\beta}(Cl_{1-e1}I_{e1})_{\beta}$,
$(Li_{1-x1}Cs_{x1})_{7+\alpha-\beta}(P_{1-y1}Rh_{y1})\alpha S_{6-\beta}(Cl_{1-e1}Br_{e1})_{\beta}$,
$(Li_{1-x1}Fr_{x1})_{7+\alpha-\beta}(P_{1-y1}Rh_{y1})\alpha S_{6-\beta}(Cl_{1-e1}I_{e1})_{\beta}$,
$(Li_{1-x1}Fr_{x1})_{7+\alpha-\beta}(P_{1-y1}Rh_{y1})\alpha S_{6-\beta}(Cl_{1-e1}Br_{e1})_{\beta}$,
$(Li_{1-x1}Na_{x1})_{7+\alpha-\beta}(P_{1-y1}Ir_{y1})\alpha S_{6-\beta}(Cl_{1-e1}I_{e1})_{\beta}$,
$(Li_{1-x1}Na_{x1})_{7+\alpha-\beta}(P_{1-y1}Ir_{y1})\alpha S_{6-\beta}(Cl_{1-e1}Br_{e1})_{\beta}$,
$(Li_{1-x}K_{x1})_{7+\alpha-\beta}(P_{1-y1}Ir_{y1})\alpha S_{6-\beta}(Cl_{1-e1}I_{e1})_{\beta}$,
$(Li_{1-x1}K_{x1})_{7+\alpha-\beta}(P_{1-y1}Ir_{y1})\alpha S_{6-\beta}(Cl_{1-e1}Br_{e1})_{\beta}$,
$(Li_{1-x1}Rb_{x1})_{7+\alpha-\beta}(P_{1-y1}Ir_{y1})\alpha S_{6-\beta}(Cl_{1-e1}I_{e1})_{\beta}$,
$(Li_{1-x1}Rb_{x1})_{7+\alpha-\beta}(P_{1-y1}Ir_{y1})\alpha S_{6-\beta}(Cl_{1-e1}Br_{e1})_{\beta}$,
$(Li_{1-x1}Cs_{x1})_{7+\alpha-\beta}(P_{1-y1}Ir_{y1})\alpha S_{6-\beta}(Cl_{1-e1}I_{e1})_{\beta}$,
$(Li_{1-x1}Cs_{x1})_{7+\alpha-\beta}(P_{1-y1}Ir_{y1})\alpha S_{6-\beta}(Cl_{1-e1}Br_{e1})_{\beta}$,
$(Li_{1-x1}Fr_{x1})_{7+\alpha-\beta}(P_{1-y1}Ir_{y1})\alpha S_{6-\beta}(Cl_{1-e1}I_{e1})_{\beta}$,
$(Li_{1-x1}Fr_{x1})_{7+\alpha-\beta}(P_{1-y1}Ir_{y1})\alpha S_{6-\beta}(Cl_{1-e1}Br_{e1})_{\beta}$,
$(Li_{1-x1}Na_{x1})_{7+\alpha-\beta}(P_{1-y1}Ni_{y1})\alpha S_{6-\beta}(Cl_{1-e1}I_{e1})_{\beta}$,
$(Li_{1-x1}Na_{x1})_{7+\alpha-\beta}(P_{1-y1}Ni_{y1})\alpha S_{6-\beta}(Cl_{1-e1}Br_{e1})_{\beta}$,
$(Li_{1-x1}K_{x1})_{7+\alpha-\beta}(P_{1-y1}Ni_{y1})\alpha S_{6-\beta}(Cl_{1-e1}I_{e1})_{\beta}$,
$(Li_{1-x1}K_{x1})_{7+\alpha-\beta}(P_{1-y1}Ni_{y1})\alpha S_{6-\beta}(Cl_{1-e1}Br_{e1})_{\beta}$,
$(Li_{1-x1}Rb_{x1})_{7+\alpha-\beta}(P_{1-y1}Ni_{y1})\alpha S_{6-\beta}(Cl_{1-e1}I_{e1})_{\beta}$,
$(Li_{1-x1}Rb_{x1})_{7+\alpha-\beta}(P_{1-y1}Ni_{y1})\alpha S_{6-\beta}(Cl_{1-e1}Br_{e1})_{\beta}$,
$(Li_{1-x1}Cs_{x1})_{7+\alpha-\beta}(P_{1-y1}Ni_{y1})\alpha S_{6-\beta}(Cl_{1-e1}I_{e1})_{\beta}$,
$(Li_{1-x1}Cs_{x1})_{7+\alpha-\beta}(P_{1-y1}Ni_{y1})\alpha S_{6-\beta}(Cl_{1-e1}Br_{e1})_{\beta}$,
$(Li_{1-x1}Fr_{x1})_{7+\alpha-\beta}(P_{1-y1}Ni_{y1})\alpha S_{6-\beta}(Cl_{1-e1}I_{e1})_{\beta}$,
$(Li_{1-x1}Fr_{x1})_{7+\alpha-\beta}(P_{1-y1}Ni_{y1})\alpha S_{6-\beta}(Cl_{1-e1}Br_{e1})_{\beta}$,
$(Li_{1-x1}Na_{x1})_{7+\alpha-\beta}(P_{1-y1}Pd_{y1})\alpha S_{6-\beta}(Cl_{1-e1}I_{e1})_{\beta}$,
$(Li_{1-x1}Na_{x1})_{7+\alpha-\beta}(P_{1-y1}Pd_{y1})\alpha S_{6-\beta}(Cl_{1-e1}Br_{e1})_{\beta}$,
$(Li_{1-x1}K_{x1})_{7+\alpha-\beta}(P_{1-y1}Pd_{y1})\alpha S_{6-\beta}(Cl_{1-e1}I_{e1})_{\beta}$,
$(Li_{1-x1}K_{x1})_{7+\alpha-\beta}(P_{1-y1}Pd_{y1})\alpha S_{6-\beta}(Cl_{1-e1}Br_{e1})_{\beta}$,
$(Li_{1-x1}Rb_{x1})_{7+\alpha-\beta}(P_{1-y1}Pd_{y1})\alpha S_{6-\beta}(Cl_{1-e1}I_{e1})_{\beta}$,
$(Li_{1-x1}Rb_{x1})_{7+\alpha-\beta}(P_{1-y1}Pd_{y1})\alpha S_{6-\beta}(Cl_{1-e1}Br_{e1})_{\beta}$,
$(Li_{1-x1}Cs_{x1})_{7+\alpha-\beta}(P_{1-y1}Pd_{y1})\alpha S_{6-\beta}(Cl_{1-e1}I_{e1})_{\beta}$,
$(Li_{1-x1}Cs_{x1})_{7+\alpha-\beta}(P_{1-y1}Pd_{y1})\alpha S_{6-\beta}(Cl_{1-e1}Br_{e1})_{\beta}$,
$(Li_{1-x1}Fr_{x1})_{7+\alpha-\beta}(P_{1-y1}Pd_{y1})\alpha S_{6-\beta}(Cl_{1-e1}I_{e1})_{\beta}$,
$(Li_{1-x1}Fr_{x1})_{7+\alpha-\beta}(P_{1-y1}Pd_{y1})\alpha S_{6-\beta}(Cl_{1-e1}Br_{e1})_{\beta}$,
$(Li_{1-x1}Na_{x1})_{7+\alpha-\beta}(P_{1-y1}Pt_{y1})\alpha S_{6-\beta}(Cl_{1-e1}I_{e1})_{\beta}$,
$(Li_{1-x1}Na_{x1})_{7+\alpha-\beta}(P_{1-y1}Pt_{y1})\alpha S_{6-\beta}(Cl_{1-e1}Br_{e1})_{\beta}$,
$(Li_{1-x1}K_{x1})_{7+\alpha-\beta}(P_{1-y1}Pt_{y1})\alpha S_{6-\beta}(Cl_{1-e1}I_{e1})_{\beta}$,
$(Li_{1-x1}K_{x1})_{7+\alpha-\beta}(P_{1-y1}Pt_{y1})\alpha S_{6-\beta}(Cl_{1-e1}Br_{e1})_{\beta}$,
$(Li_{1-x1}Rb_{x1})_{7+\alpha-\beta}(P_{1-y1}Pt_{y1})\alpha S_{6-\beta}(Cl_{1-e1}I_{e1})_{\beta}$,
$(Li_{1-x1}Rb_{x1})_{7+\alpha-\beta}(P_{1-y1}Pt_{y1})\alpha S_{6-\beta}(Cl_{1-e1}Br_{e1})_{\beta}$,
$(Li_{1-x1}Cs_{x1})_{7+\alpha-\beta}(P_{1-y1}Pt_{y1})\alpha S_{6-\beta}(Cl_{1-e1}I_{e1})_{\beta}$,
$(Li_{1-x1}Cs_{x1})_{7+\alpha-\beta}(P_{1-y1}Pt_{y1})\alpha S_{6-\beta}(Cl_{1-e1}Br_{e1})_{\beta}$,
$(Li_{1-x1}Fr_{x1})_{7+\alpha-\beta}(P_{1-y1}Pt_{y1})\alpha S_{6-\beta}(Cl_{1-e1}I_{e1})_{\beta}$,
$(Li_{1-x1}Fr_{x1})_{7+\alpha-\beta}(P_{1-y1}Pt_{y1})\alpha S_{6-\beta}(Cl_{1-e1}Br_{e1})_{\beta}$,
$(Li_{1-x1}Na_{x1})_{7+\alpha-\beta}(P_{1-y1}Cu_{y1})\alpha S_{6-\beta}(Cl_{1-e1}I_{e1})_{\beta}$,
$(Li_{1-x1}Na_{x1})_{7+\alpha-\beta}(P_{1-y1}Cu_{y1})\alpha S_{6-\beta}(Cl_{1-e1}Br_{e1})_{\beta}$,
$(Li_{1-x1}K_{x1})_{7+\alpha-\beta}(P_{1-y1}Cu_{y1})\alpha S_{6-\beta}(Cl_{1-e1}I_{e1})_{\beta}$,
$(Li_{1-x1}K_{x1})_{7+\alpha-\beta}(P_{1-y1}Cu_{y1})\alpha S_{6-\beta}(Cl_{1-e1}Br_{e1})_{\beta}$,
$(Li_{1-x1}Rb_{x1})_{7+\alpha-\beta}(P_{1-y1}Cu_{y1})\alpha S_{6-\beta}(Cl_{1-e1}I_{e1})_{\beta}$,
$(Li_{1-x1}Rb_{x1})_{7+\alpha-\beta}(P_{1-y1}Cu_{y1})\alpha S_{6-\beta}(Cl_{1-e1}Br_{e1})_{\beta}$,
$(Li_{1-x1}Cs_{x1})_{7+\alpha-\beta}(P_{1-y1}Cu_{y1})\alpha S_{6-\beta}(Cl_{1-e1}I_{e1})_{\beta}$,
$(Li_{1-x1}Cs_{x1})_{7+\alpha-\beta}(P_{1-y1}Cu_{y1})\alpha S_{6-\beta}(Cl_{1-e1}Br_{e1})_{\beta}$,
$(Li_{1-x1}Fr_{x1})_{7+\alpha-\beta}(P_{1-y1}Cu_{y1})\alpha S_{6-\beta}(Cl_{1-e1}I_{e1})_{\beta}$,
$(Li_{1-x1}Fr_{x1})_{7+\alpha-\beta}(P_{1-y1}Cu_{y1})\alpha S_{6-\beta}(Cl_{1-e1}Br_{e1})_{\beta}$,
$(Li_{1-x1}Na_{x1})_{7+\alpha-\beta}(P_{1-y1}Ag_{y1})\alpha S_{6-\beta}(Cl_{1-e1}I_{e1})_{\beta}$,
$(Li_{1-x1}Na_{x1})_{7+\alpha-\beta}(P_{1-y1}Ag_{y1})\alpha S_{6-\beta}(Cl_{1-e1}Br_{e1})_{\beta}$,
$(Li_{1-x1}K_{x1})_{7+\alpha-\beta}(P_{1-y1}Ag_{y1})\alpha S_{6-\beta}(Cl_{1-e1}I_{e1})_{\beta}$,
$(Li_{1-x1}K_{x1})_{7+\alpha-\beta}(P_{1-y1}Ag_{y1})\alpha S_{6-\beta}(Cl_{1-e1}Br_{e1})_{\beta}$,
$(Li_{1-x1}Rb_{x1})_{7+\alpha-\beta}(P_{1-y1}Ag_{y1})\alpha S_{6-\beta}(Cl_{1-e1}I_{e1})_{\beta}$,
$(Li_{1-x1}Rb_{x1})_{7+\alpha-\beta}(P_{1-y1}Ag_{y1})\alpha S_{6-\beta}(Cl_{1-e1}Br_{e1})_{\beta}$,
$(Li_{1-x1}Cs_{x1})_{7+\alpha-\beta}(P_{1-y1}Ag_{y1})\alpha S_{6-\beta}(Cl_{1-e1}I_{e1})_{\beta}$,
$(Li_{1-x1}Cs_{x1})_{7+\alpha-\beta}(P_{1-y1}Ag_{y1})\alpha S_{6-\beta}(Cl_{1-e1}Br_{e1})_{\beta}$,
$(Li_{1-x1}Fr_{x1})_{7+\alpha-\beta}(P_{1-y1}Ag_{y1})\alpha S_{6-\beta}(Cl_{1-e1}I_{e1})_{\beta}$,
$(Li_{1-x1}Fr_{x1})_{7+\alpha-\beta}(P_{1-y1}Ag_{y1})\alpha S_{6-\beta}(Cl_{1-e1}Br_{e1})_{\beta}$, $(Li_{1-x1}Na_{x1})_{7+\alpha-\beta}(P_{1-y1}Au_{y1})\alpha S_{6-\beta}(Cl_{1-e1}I_{e1})_{\beta}$,
$(Li_{1-x1}Na_{x1})_{7+\alpha-\beta}(P_{1-y1}Au_{y1})\alpha S_{6-\beta}(Cl_{1-e1}Br_{e1})_{\beta}$,
$(Li_{1-x1}K_{x1})_{7+\alpha-\beta}(P_{1-y1}Au_{y1})\alpha S_{6-\beta}(Cl_{1-e1}I_{e1})_{\beta}$,
$(Li_{1-x1}K_{x1})_{7+\alpha-\beta}(P_{1-y1}Au_{y1})\alpha S_{6-\beta}(Cl_{1-e1}Br_{e1})_{\beta}$,
$(Li_{1-x1}Rb_{x1})_{7+\alpha-\beta}(P_{1-y1}Au_{y1})\alpha S_{6-\beta}(Cl_{1-e1}I_{e1})_{\beta}$,
$(Li_{1-x1}Rb_{x1})_{7+\alpha-\beta}(P_{1-y1}Au_{y1})\alpha S_{6-\beta}(Cl_{1-e1}Br_{e1})_{\beta}$,
$(Li_{1-x1}Cs_{x1})_{7+\alpha-\beta}(P_{1-y1}Au_{y1})\alpha S_{6-\beta}(Cl_{1-e1}I_{e1})_{\beta}$,
$(Li_{1-x1}Cs_{x1})_{7+\alpha-\beta}(P_{1-y1}Au_{y1})\alpha S_{6-\beta}(Cl_{1-e1}Br_{e1})_{\beta}$,
$(Li_{1-x1}Fr_{x1})_{7+\alpha-\beta}(P_{1-y1}Au_{y1})\alpha S_{6-\beta}(Cl_{1-e1}I_{e1})_{\beta}$,
$(Li_{1-x1}Fr_{x1})_{7+\alpha-\beta}(P_{1-y1}Au_{y1})\alpha S_{6-\beta}(Cl_{1-e1}Br_{e1})_{\beta}$,
$(Li_{1-x1}Na_{x1})_{7+\alpha-\beta}(P_{1-y1}Zn_{y1})\alpha S_{6-\beta}(Cl_{1-e1}I_{e1})_{\beta}$,
$(Li_{1-x1}Na_{x1})_{7+\alpha-\beta}(P_{1-y1}Zn_{y1})\alpha S_{6-\beta}(Cl_{1-e1}Br_{e1})_{\beta}$,
$(Li_{1-x1}K_{x1})_{7+\alpha-\beta}(P_{1-y1}Zn_{y1})\alpha S_{6-\beta}(Cl_{1-e1}I_{e1})_{\beta}$,
$(Li_{1-x1}K_{x1})_{7+\alpha-\beta}(P_{1-y1}Zn_{y1})\alpha S_{6-\beta}(Cl_{1-e1}Br_{e1})_{\beta}$,
$(Li_{1-x1}Rb_{x1})_{7+\alpha-\beta}(P_{1-y1}Zn_{y1})\alpha S_{6-\beta}(Cl_{1-e1}I_{e1})_{\beta}$,
$(Li_{1-x1}Rb_{x1})_{7+\alpha-\beta}(P_{1-y1}Zn_{y1})\alpha S_{6-\beta}(Cl_{1-e1}Br_{e1})_{\beta}$,
$(Li_{1-x1}Cs_{x1})_{7+\alpha-\beta}(P_{1-y1}Zn_{y1})\alpha S_{6-\beta}(Cl_{1-e1}I_{e1})_{\beta}$,
$(Li_{1-x1}Cs_{x1})_{7+\alpha-\beta}(P_{1-y1}Zn_{y1})\alpha S_{6-\beta}(Cl_{1-e1}Br_{e1})_{\beta}$,
$(Li_{1-x1}Fr_{x1})_{7+\alpha-\beta}(P_{1-y1}Zn_{y1})\alpha S_{6-\beta}(Cl_{1-e1}I_{e1})_{\beta}$,
$(Li_{1-x1}Fr_{x1})_{7+\alpha-\beta}(P_{1-y1}Zn_{y1})\alpha S_{6-\beta}(Cl_{1-e1}Br_{e1})_{\beta}$,
$(Li_{1-x1}Na_{x1})_{7+\alpha-\beta}(P_{1-y1}Cd_{y1})\alpha S_{6-\beta}(Cl_{1-e1}I_{e1})_{\beta}$,
$(Li_{1-x1}Na_{x1})_{7+\alpha-\beta}(P_{1-y1}Cd_{y1})\alpha S_{6-\beta}(Cl_{1-e1}Br_{e1})_{\beta}$,
$(Li_{1-x1}K_{x1})_{7+\alpha-\beta}(P_{1-y1}Cd_{y1})\alpha S_{6-\beta}(Cl_{1-e1}I_{e1})_{\beta}$,
$(Li_{1-x1}K_{x1})_{7+\alpha-\beta}(P_{1-y1}Cd_{y1})\alpha S_{6-\beta}(Cl_{1-e1}Br_{e1})_{\beta}$,
$(Li_{1-x1}Rb_{x1})_{7+\alpha-\beta}(P_{1-y1}Cd_{y1})\alpha S_{6-\beta}(Cl_{1-e1}I_{e1})_{\beta}$,
$(Li_{1-x1}Rb_{x1})_{7+\alpha-\beta}(P_{1-y1}Cd_{y1})\alpha S_{6-\beta}(Cl_{1-e1}Br_{e1})_{\beta}$,
$(Li_{1-x1}Cs_{x1})_{7+\alpha-\beta}(P_{1-y1}Cd_{y1})\alpha S_{6-\beta}(Cl_{1-e1}I_{e1})_{\beta}$,
$(Li_{1-x1}Cs_{x1})_{7+\alpha-\beta}(P_{1-y1}Cd_{y1})\alpha S_{6-\beta}(Cl_{1-e1}Br_{e1})_{\beta}$,
$(Li_{1-x1}Fr_{x1})_{7+\alpha-\beta}(P_{1-y1}Cd_{y1})\alpha S_{6-\beta}(Cl_{1-e1}I_{e1})_{\beta}$,
$(Li_{1-x1}Fr_{x1})_{7+\alpha-\beta}(P_{1-y1}Cd_{y1})\alpha S_{6-\beta}(Cl_{1-e1}Br_{e1})_{\beta}$,
$(Li_{1-x1}Na_{x1})_{7+\alpha-\beta}(P_{1-y1}Hg_{y1})\alpha S_{6-\beta}(Cl_{1-e1}I_{e1})_{\beta}$,
$(Li_{1-x1}Na_{x1})_{7+\alpha-\beta}(P_{1-y1}Hg_{y1})\alpha S_{6-\beta}(Cl_{1-e1}Br_{e1})_{\beta}$,
$(Li_{1-x1}K_{x1})_{7+\alpha-\beta}(P_{1-y1}Hg_{y1})\alpha S_{6-\beta}(Cl_{1-e1}I_{e1})_{\beta}$,
$(Li_{1-x1}K_{x1})_{7+\alpha-\beta}(P_{1-y1}Hg_{y1})\alpha S_{6-\beta}(Cl_{1-e1}Br_{e1})_{\beta}$,
$(Li_{1-x1}Rb_{x1})_{7+\alpha-\beta}(P_{1-y1}Hg_{y1})\alpha S_{6-\beta}(Cl_{1-e1}I_{e1})_{\beta}$,
$(Li_{1-x1}Rb_{x1})_{7+\alpha-\beta}(P_{1-y1}Hg_{y1})\alpha S_{6-\beta}(Cl_{1-e1}Br_{e1})_{\beta}$,
$(Li_{1-x1}Cs_{x1})_{7+\alpha-\beta}(P_{1-y1}Hg_{y1})\alpha S_{6-\beta}(Cl_{1-e1}I_{e1})_{\beta}$,
$(Li_{1-x1}Cs_{x1})_{7+\alpha-\beta}(P_{1-y1}Hg_{y1})\alpha S_{6-\beta}(Cl_{1-e1}Br_{e1})_{\beta}$,
$(Li_{1-x1}Fr_{x1})_{7+\alpha-\beta}(P_{1-y1}Hg_{y1})\alpha S_{6-\beta}(Cl_{1-e1}I_{e1})_{\beta}$,
$(Li_{1-x1}Fr_{x1})_{7+\alpha-\beta}(P_{1-y1}Hg_{y1})\alpha S_{6-\beta}(Cl_{1-e1}Br_{e1})_{\beta}$,
$(Li_{1-x1}Na_{x1})_{7+\alpha-\beta}(P_{1-y1}Al_{y1})\alpha S_{6-\beta}(Cl_{1-e1}I_{e1})_{\beta}$,
$(Li_{1-x1}Na_{x1})_{7+\alpha-\beta}(P_{1-y1}Al_{y1})\alpha S_{6-\beta}(Cl_{1-e1}Br_{e1})_{\beta}$,
$(Li_{1-x1}K_{x1})_{7+\alpha-\beta}(P_{1-y1}Al_{y1})\alpha S_{6-\beta}(Cl_{1-e1}I_{e1})_{\beta}$,
$(Li_{1-x1}K_{x1})_{7+\alpha-\beta}(P_{1-y1}Al_{y1})\alpha S_{6-\beta}(Cl_{1-e1}Br_{e1})_{\beta}$,
$(Li_{1-x1}Rb_{x1})_{7+\alpha-\beta}(P_{1-y1}Al_{y1})\alpha S_{6-\beta}(Cl_{1-e1}I_{e1})_{\beta}$,
$(Li_{1-x1}Rb_{x1})_{7+\alpha-\beta}(P_{1-y1}Al_{y1})\alpha S_{6-\beta}(Cl_{1-e1}Br_{e1})_{\beta}$,
$(Li_{1-x1}Cs_{x1})_{7+\alpha-\beta}(P_{1-y1}Al_{y1})\alpha S_{6-\beta}(Cl_{1-e1}I_{e1})_{\beta}$,
$(Li_{1-x1}Cs_{x1})_{7+\alpha-\beta}(P_{1-y1}Al_{y1})\alpha S_{6-\beta}(Cl_{1-e1}Br_{e1})_{\beta}$,
$(Li_{1-x1}Fr_{x1})_{7+\alpha-\beta}(P_{1-y1}Al_{y1})\alpha S_{6-\beta}(Cl_{1-e1}I_{e1})_{\beta}$,
$(Li_{1-x1}Fr_{x1})_{7+\alpha-\beta}(P_{1-y1}Al_{y1})\alpha S_{6-\beta}(Cl_{1-e1}Br_{e1})_{\beta}$,
$(Li_{1-x1}Na_{x1})_{7+\alpha-\beta}(P_{1-y1}Ga_{y1})\alpha S_{6-\beta}(Cl_{1-e1}I_{e1})_{\beta}$,
$(Li_{1-x1}Na_{x1})_{7+\alpha-\beta}(P_{1-y1}Ga_{y1})\alpha S_{6-\beta}(Cl_{1-e1}Br_{e1})_{\beta}$,
$(Li_{1-x1}K_{x1})_{7+\alpha-\beta}(P_{1-y1}Ga_{y1})\alpha S_{6-\beta}(Cl_{1-e1}I_{e1})_{\beta}$,
$(Li_{1-x1}K_{x1})_{7+\alpha-\beta}(P_{1-y1}Ga_{y1})\alpha S_{6-\beta}(Cl_{1-e1}Br_{e1})_{\beta}$,
$(Li_{1-x1}Rb_{x1})_{7+\alpha-\beta}(P_{1-y1}Ga_{y1})\alpha S_{6-\beta}(Cl_{1-e1}I_{e1})_{\beta}$,
$(Li_{1-x1}Rb_{x1})_{7+\alpha-\beta}(P_{1-y1}Ga_{y1})\alpha S_{6-\beta}(Cl_{1-e1}Br_{e1})_{\beta}$,
$(Li_{1-x1}Cs_{x1})_{7+\alpha-\beta}(P_{1-y1}Ga_{y1})\alpha S_{6-\beta}(Cl_{1-e1}I_{e1})_{\beta}$,
$(Li_{1-x1}Cs_{x1})_{7+\alpha-\beta}(P_{1-y1}Ga_{y1})\alpha S_{6-\beta}(Cl_{1-e1}Br_{e1})_{\beta}$,
$(Li_{1-x1}Fr_{x1})_{7+\alpha-\beta}(P_{1-y1}Ga_{y1})\alpha S_{6-\beta}(Cl_{1-e1}I_{e1})_{\beta}$,
$(Li_{1-x1}Fr_{x1})_{7+\alpha-\beta}(P_{1-y1}Ga_{y1})\alpha S_{6-\beta}(Cl_{1-e1}Br_{e1})_{\beta}$,
$(Li_{1-x1}Na_{x1})_{7+\alpha-\beta}(P_{1-y1}In_{y1})\alpha S_{6-\beta}(Cl_{1-e1}I_{e1})_{\beta}$,
$(Li_{1-x1}Na_{x1})_{7+\alpha-\beta}(P_{1-y1}In_{y1})\alpha S_{6-\beta}(Cl_{1-e1}Br_{e1})_{\beta}$,
$(Li_{1-x1}K_{x1})_{7+\alpha-\beta}(P_{1-y1}In_{y1})\alpha S_{6-\beta}(Cl_{1-e1}I_{e1})_{\beta}$,
$(Li_{1-x1}K_{x1})_{7+\alpha-\beta}(P_{1-y1}In_{y1})\alpha S_{6-\beta}(Cl_{1-e1}Br_{e1})_{\beta}$,
$(Li_{1-x1}Rb_{x1})_{7+\alpha-\beta}(P_{1-y1}In_{y1})\alpha S_{6-\beta}(Cl_{1-e1}I_{e1})_{\beta}$,
$(Li_{1-x1}Rb_{x1})_{7+\alpha-\beta}(P_{1-y1}In_{y1})\alpha S_{6-\beta}(Cl_{1-e1}Br_{e1})_{\beta}$,
$(Li_{1-x1}Cs_{x1})_{7+\alpha-\beta}(P_{1-y1}In_{y1})\alpha S_{6-\beta}(Cl_{1-e1}I_{e1})_{\beta}$, $(Li_{1-x1}Cs_{x1})_{7+\alpha-\beta}(P_{1-y1}In_{y1})\alpha S_{6-\beta}(Cl_{1-e1}Br_{e1})_{\beta}$, $(Li_{1-x1}Fr_{x1})_{7+\alpha-\beta}(P_{1-y1}In_{y1})\alpha S_{6-\beta}(Cl_{1-e1}I_{e1})_{\beta}$, $(Li_{1-x1}Fr_{x1})_{7+\alpha-\beta}(P_{1-y1}In_{y1})\alpha S_{6-\beta}(Cl_{1-e1}Br_{e1})_{\beta}$, $(Li_{1-x1}Na_{x1})_{7+\alpha-\beta}(P_{1-y1}Tl_{y1})\alpha S_{6-\beta}(Cl_{1-e1}I_{e1})_{\beta}$, $(Li_{1-x1}Na_{x1})_{7+\alpha-\beta}(P_{1-y1}Tl_{y1})\alpha S_{6-\beta}(Cl_{1-e1}Br_{e1})_{\beta}$, $(Li_{1-x1}K_{x1})_{7+\alpha-\beta}(P_{1-y1}Tl_{y1})\alpha S_{6-\beta}(Cl_{1-e1}I_{e1})_{\beta}$, $(Li_{1-x1}K_{x1})_{7+\alpha-\beta}(P_{1-y1}Tl_{y1})\alpha S_{6-\beta}(Cl_{1-e1}Br_{e1})_{\beta}$, $(Li_{1-x1}Rb_{x1})_{7+\alpha-\beta}(P_{1-y1}Tl_{y1})\alpha S_{6-\beta}(Cl_{1-e1}I_{e1})_{\beta}$, $(Li_{1-x1}Rb_{x1})_{7+\alpha-\beta}(P_{1-y1}Tl_{y1})\alpha S_{6-\beta}(Cl_{1-e1}Br_{e1})_{\beta}$, $(Li_{1-x1}Cs_{x1})_{7+\alpha-\beta}(P_{1-y1}Tl_{y1})\alpha S_{6-\beta}(Cl_{1-e1}I_{e1})_{\beta}$, $(Li_{1-x1}Cs_{x1})_{7+\alpha-\beta}(P_{1-y1}Tl_{y1})\alpha S_{6-\beta}(Cl_{1-e1}Br_{e1})_{\beta}$, $(Li_{1-x1}Fr_{x1})_{7+\alpha-\beta}(P_{1-y1}Tl_{y1})\alpha S_{6-\beta}(Cl_{1-e1}I_{e1})_{\beta}$, $(Li_{1-x1}Fr_{x1})_{7+\alpha-\beta}(P_{1-y1}Tl_{y1})\alpha S_{6-\beta}(Cl_{1-e1}Br_{e1})_{\beta}$, $(Li_{1-x1}Na_{x1})_{7+\alpha-\beta}(P_{1-y1}Sn_{y1})\alpha S_{6-\beta}(Cl_{1-e1}I_{e1})_{\beta}$, $(Li_{1-x1}Na_{x1})_{7+\alpha-\beta}(P_{1-y1}Sn_{y1})\alpha S_{6-\beta}(Cl_{1-e1}Br_{e1})_{\beta}$, $(Li_{1-x1}K_{x1})_{7+\alpha-\beta}(P_{1-y1}Sn_{y1})\alpha S_{6-\beta}(Cl_{1-e1}I_{e1})_{\beta}$, $(Li_{1-x1}K_{x1})_{7+\alpha-\beta}(P_{1-y1}Sn_{y1})\alpha S_{6-\beta}(Cl_{1-e1}Br_{e1})_{\beta}$, $(Li_{1-x1}Rb_{x1})_{7+\alpha-\beta}(P_{1-y1}Sn_{y1})\alpha S_{6-\beta}(Cl_{1-e1}I_{e1})_{\beta}$, $(Li_{1-x1}Rb_{x1})_{7+\alpha-\beta}(P_{1-y1}Sn_{y1})\alpha S_{6-\beta}(Cl_{1-e1}Br_{e1})_{\beta}$, $(Li_{1-x1}Cs_{x1})_{7+\alpha-\beta}(P_{1-y1}Sn_{y1})\alpha S_{6-\beta}(Cl_{1-e1}I_{e1})_{\beta}$, $(Li_{1-x1}Cs_{x1})_{7+\alpha-\beta}(P_{1-y1}Sn_{y1})\alpha S_{6-\beta}(Cl_{1-e1}Br_{e1})_{\beta}$, $(Li_{1-x1}Fr_{x1})_{7+\alpha-\beta}(P_{1-y1}Sn_{y1})\alpha S_{6-\beta}(Cl_{1-e1}I_{e1})_{\beta}$, $(Li_{1-x1}Fr_{x1})_{7+\alpha-\beta}(P_{1-y1}Sn_{y1})\alpha S_{6-\beta}(Cl_{1-e1}Br_{e1})_{\beta}$, $(Li_{1-x1}Na_{x1})_{7+\alpha-\beta}(P_{1-y1}Pb_{y1})_{\alpha}S_{6-\beta}(Cl_{1-e1}I_{e1})_{\beta}$, $(Li_{1-x1}Na_{x1})_{7+\alpha-\beta}(P_{1-y1}Pb_{y1})_{\alpha}S_{6-\beta}(Cl_{1-e1}Br_{e1})_{\beta}$, $(Li_{1-x1}K_{x1})_{7+\alpha-\beta}(P_{1-y1}Pb_{y1})_{\alpha}S_{6-\beta}(Cl_{1-e1}I_{e1})_{\beta}$, $(Li_{1-x1}K_{x1})_{7+\alpha-\beta}(P_{1-y1}Pb_{y1})_{\alpha}S_{6-\beta}(Cl_{1-e1}Br_{e1})_{\beta}$, $(Li_{1-x1}Rb_{x1})_{7+\alpha-\beta}(P_{1-y1}Pb_{y1})\alpha S_{6-\beta}(Cl_{1-e1}I_{e1})_{\beta}$, $(Li_{1-x1}Rb_{x1})_{7+\alpha-\beta}(P_{1-y1}Pb_{y1})\alpha S_{6-\beta}(Cl_{1-e1}Br_{e1})_{\beta}$, $(Li_{1-x1}Cs_{x1})_{7+\alpha-\beta}(P_{1-y1}Pb_{y1})\alpha S_{6-\beta}(Cl_{1-e1}I_{e1})_{\beta}$, $(Li_{1-x1}Cs_{x1})_{7+\alpha-\beta}(P_{1-y1}Pb_{y1})\alpha S_{6-\beta}(Cl_{1-e1}Br_{e1})_{\beta}$, $(Li_{1-x1}Fr_{x1})_{7+\alpha-\beta}(P_{1-y1}Pb_{y1})\alpha S_{6-\beta}(Cl_{1-e1}I_{e1})_{\beta}$, $(Li_{1-x1}Fr_{x1})_{7+\alpha-\beta}(P_{1-y1}Pb_{y1})\alpha S_{6-\beta}(Cl_{1-e1}Br_{e1})_{\beta}$, $(Li_{1-x1}Na_{x1})_{7+\alpha-\beta}(P_{1-y1}As_{y1})\alpha S_{6-\beta}(Cl_{1-e1}I_{e1})_{\beta}$, $(Li_{1-x1}Na_{x1})_{7+\alpha-\beta}(P_{1-y1}As_{y1})\alpha S_{6-\beta}(Cl_{1-e1}Br_{e1})_{\beta}$, $(Li_{1-x1}K_{x1})_{7+\alpha-\beta}(P_{1-y1}As_{y1})_{\alpha}S_{6-\beta}(Cl_{1-e1}I_{e1})_{\beta}$, $(Li_{1-x1}K_{x1})_{7+\alpha-\beta}(P_{1-y1}As_{y1})_{\alpha}S_{6-\beta}(Cl_{1-e1}Br_{e1})_{\beta}$, $(Li_{1-x1}Rb_{x1})_{7+\alpha-\beta}(P_{1-y1}As_{y1})\alpha S_{6-\beta}(Cl_{1-e1}I_{e1})_{\beta}$, $(Li_{1-x1}Rb_{x1})_{7+\alpha-\beta}(P_{1-y1}As_{y1})\alpha S_{6-\beta}(Cl_{1-e1}Br_{e1})_{\beta}$, $(Li_{1-x1}Cs_{x1})_{7+\alpha-\beta}(P_{1-y1}As_{y1})\alpha S_{6-\beta}(Cl_{1-e1}I_{e1})_{\beta}$, $(Li_{1-x1}Cs_{x1})_{7+\alpha-\beta}(P_{1-y1}As_{y1})\alpha S_{6-\beta}(Cl_{1-e1}Br_{e1})_{\beta}$, $(Li_{1-x1}Fr_{x1})_{7+\alpha-\beta}(P_{1-y1}As_{y1})\alpha S_{6-\beta}(Cl_{1-e1}I_{e1})_{\beta}$, $(Li_{1-x1}Fr_{x1})_{7+\alpha-\beta}(P_{1-y1}As_{y1})\alpha S_{6-\beta}(Cl_{1-e1}Br_{e1})_{\beta}$, $(Li_{1-x1}Na_{x1})_{7+\alpha-\beta}(P_{1-y1}Sb_{y1})\alpha S_{6-\beta}(Cl_{1-e1}I_{e1})_{\beta}$, $(Li_{1-x1}Na_{x1})_{7+\alpha-\beta}(P_{1-y1}Sb_{y1})\alpha S_{6-\beta}(Cl_{1-e1}Br_{e1})_{\beta}$, $(Li_{1-x1}K_{x1})_{7+\alpha-\beta}(P_{1-y1}Sb_{y1})\alpha S_{6-\beta}(Cl_{1-e1}I_{e1})_{\beta}$, $(Li_{1-x1}K_{x1})_{7+\alpha-\beta}(P_{1-y1}Sb_{y1})\alpha S_{6-\beta}(Cl_{1-e1}Br_{e1})_{\beta}$, $(Li_{1-x1}Rb_{x1})_{7+\alpha-\beta}(P_{1-y1}Sb_{y1})\alpha S_{6-\beta}(Cl_{1-e1}I_{e1})_{\beta}$, $(Li_{1-x1}Rb_{x1})_{7+\alpha-\beta}(P_{1-y1}Sb_{y1})\alpha S_{6-\beta}(Cl_{1-e1}Br_{e1})_{\beta}$, $(Li_{1-x1}Cs_{x1})_{7+\alpha-\beta}(P_{1-y1}Sb_{y1})\alpha S_{6-\beta}(Cl_{1-e1}I_{e1})_{\beta}$, $(Li_{1-x1}Cs_{x1})_{7+\alpha-\beta}(P_{1-y1}Sb_{y1})\alpha S_{6-\beta}(Cl_{1-e1}Br_{e1})_{\beta}$, $(Li_{1-x1}Fr_{x1})_{7+\alpha-\beta}(P_{1-y1}Sb_{y1})\alpha S_{6-\beta}(Cl_{1-e1}I_{e1})_{\beta}$, $(Li_{1-x1}Fr_{x1})_{7+\alpha-\beta}(P_{1-y1}Sb_{y1})\alpha S_{6-\beta}(Cl_{1-e1}Br_{e1})_{\beta}$, $(Li_{1-x1}Na_{x1})_{7+\alpha-\beta}(P_{1-y1}Bi_{y1})\alpha S_{6-\beta}(Cl_{1-e1}I_{e1})_{\beta}$, $(Li_{1-x1}Na_{x1})_{7+\alpha-\beta}(P_{1-y1}Bi_{y1})\alpha S_{6-\beta}(Cl_{1-e1}Br_{e1})_{\beta}$, $(Li_{1-x1}K_{x1})_{7+\alpha-\beta}(P_{1-y1}Bi_{y1})_{\alpha}S_{6-\beta}(Cl_{1-e1}I_{e1})$, $(Li_{1-x1}K_{x1})_{7+\alpha-\beta}(P_{1-y1}Bi_{y1})_{\alpha}S_{6-\beta}(Cl_{1-e1}Br_{e1})_{\beta}$, $(Li_{1-x1}Rb_{x1})_{7+\alpha-\beta}(P_{1-y1}Bi_{y1})_{\alpha}S_{6-\beta}(Cl_{1-e1}I_{e1})_{\beta}$, $(Li_{1-x1}Rb_{x1})_{7+\alpha-\beta}(P_{1-y1}Bi_{y1})_{\alpha}S_{6-\beta}(Cl_{1-e1}Br_{e1})_{\beta}$, $(Li_{1-x1}Cs_{x1})_{7+\alpha-\beta}(P_{1-y1}Bi_{y1})_{\alpha}S_{6-\beta}(Cl_{1-e1}I_{e1})_{\beta}$, $(Li_{1-x1}Cs_{x1})_{7+\alpha-\beta}(P_{1-y1}Bi_{y1})_{\alpha}S_{6-\beta}(Cl_{1-e1}Br_{e1})_{\beta}$, $(Li_{1-x1}Fr_{x1})_{7+\alpha-\beta}(P_{1-y1}Bi_{y1})_{\alpha}S_{6-\beta}(Cl_{1-e1}I_{e1})_{\beta}$, or $(Li_{1-x1}Fr_{x1})_{7+\alpha-\beta}(P_{1-y1}Bi_{y1})_{\alpha}S_{6-\beta}(Cl_{1-e1}Br_{e1})_{\beta}$, wherein $0<x1<1$, $0\leq y1<1$, $0<e1\leq 0.5$, $0<\alpha\leq 1$, and $0<\beta\leq 2$.

In an embodiment, the solid ion conductor compound represented by Formula 1 may be represented by Formula 3:

$$Li_{7-x2+y2-d2-e2}M2_{x2}P_{1-y2}T2_{y2}S_{6-d2-e2}Cl_{d2}X_{e2} \qquad \text{Formula 3}$$

wherein, in Formula 3,

M2 may be Na, K, Rb, Cs, Fr, or a combination thereof,

T2 may be Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X2 may be Br, I, or a combination thereof, and $0<x2<1$, $0\leq y2<1$, $1\leq d2+e2<2$, and $d2/e2\geq 1$.

In Formula 3, M2, T2, and X2 are each defined by referring to M, T, and X described herein, respectively.

In an embodiment, x2, y2, and d2+e2 may each satisfy $0<x2\leq 0.5$, $0\leq y2<0.5$, $1.3\leq d2+e2<2$.

In an embodiment, d2 and e2 may each satisfy $0.8\leq d2<2$ and $0<e2\leq 0.8$.

In an embodiment, the solid ion conductor compound may be $Li_{5.6}Na_{0.05}PS_{4.65}Cl_{1.25}I_{0.1}$, $Li_{5.47}Na_{0.03}PS_{4.5}Cl_{1.4}I_{0.1}$, $Li_{5.47}Na_{0.03}PS_{4.5}Cl_{1.4}Br_{0.1}$, $Li_{5.37}Na_{0.03}PS_{4.4}Cl_{1.4}Br_{0.2}$, $Li_{5.57}Na_{0.03}P_{0.9}Ge_{0.1}S_{4.5}ClBr_{0.5}$, $Li_{5.37}Na_{0.03}PS_{4.4}Cl_{0.5}Br_{0.5}$, $Li_{5.35}Na_{0.05}PS_{4.4}Cl_{1.5}I_{0.1}$, $Li_{5.47}Na_{0.03}PS_{4.5}Cl_{1.3}Br_{0.2}$, $Li_{5.56}Na_{0.04}PS_{4.6}Cl_{1.3}Br_{0.1}$, $Li_{5.57}Na_{0.03}P_{0.9}Ge_{0.1}S_{4.5}Cl_{0.5}Br_{0.7}$, $Li_{5.57}Na_{0.03}P_{0.5}Ge_{0.2}S_{4.5}Cl_{1.4}I_{0.1}$, or $Li_{5.57}Na_{0.03}P_{0.8}Si_{0.2}S_{4.4}Cl_{1.4}Br_{0.2}$.

The solid ion conductor compound may have improved lithium-ion conductivity. The solid ion conductor compound represented by Formula 1 may have ionic conductivity of 3.4 mS/cm or more, 4.0 mS/cm or more, 4.5 mS/cm or more, 5.0 mS/cm or more, or 5.5 mS/cm or more, at room temperature, for example, about 25° C. In addition, the solid ion conductor compound may have ionic conductivity in a range of 3.4 mS/cm to 8.0 mS/cm, 4.0 mS/cm to 8.0 mS/cm, 4.5 mS/cm to 8.0 mS/cm, 5.0 mS/cm to 8.0 mS/cm, 3.4 mS/cm to 7.9 mS/cm, 3.4 mS/cm to 7.8 mS/cm, or 3.4 mS/cm to 7.7 mS/cm, at room temperature, for example, about 25° C.

In an embodiment, the solid ion conductor compound may have a pellet density/powder density ratio of 85% or more.

Here, the pellet density is obtained by measuring density after preparing powders of the solid ion conductor compound into pellets and pressing the pellets with a force of 4 tons/cm$^2$ for 2 minutes, and the powder density is obtained by calculation according to the density functional theory known in the art.

[Solid Electrolyte]

A solid electrolyte according to an embodiment may include the solid ion conductor compound represented by Formula 1. When the solid electrolyte includes the solid ion conductor compound, the solid electrolyte may have high ionic conductivity, high chemical stability, and an effect of reducing $H_2S$ harmful gas emissions. The solid electrolyte including the solid ion conductor compound represented by Formula 1 may have improved stability to the air, and thus may provide electrochemical stability to lithium metal. Therefore, the solid ion conductor compound represented by Formula 1 may be used, for example, as a solid electrolyte of an electrochemical cell.

The solid electrolyte may additionally include, in addition to the solid ion conductor compound represented by Formula 1, a general solid electrolyte in the art. For example, a general sulfide-based solid electrolyte and/or a general oxide-based solid electrolyte in the art may be additionally included. Examples of additionally added the solid ion conductor compound in the art are $Li_2O—Al_2O_3—TiO_2—P_2O_5$ (LATP), lithium superionic conductor (LISICON), $Li_{3-y}PO_{4-x}N_x$ (LIPON, $0<y<3$, and $0<x<4$), $Li_{3.25}Ge_{0.25}P_{0.75}S_4$ (Thio-LISICON), $Li_2S$, $Li_2S—P_2S_5$, $Li_2S—SiS_2$, $Li_2S—GeS_2$, $Li_2S—B_2S_5$, $Li_2S—Al_2S_5$, and the like, but are not limited thereto. Any compound available in the art may be used.

The solid electrolyte may be in the form of powder or molding article. The solid electrolyte in the form of molding article may include, for example, a pellet form, a sheet form, a thin film, or the like, but is not limited thereto. Various forms depending on the purpose of use may be used.

[Electrochemical Cell]

An electrochemical cell according to another embodiment may include: a positive electrode layer including a positive electrode active material layer; a negative electrode layer including a negative electrode active material layer; an electrolyte layer disposed between the positive electrode layer and the negative electrode layer; and the solid ion conductor compound.

In an embodiment, the positive electrode active material layer may include the solid ion conductor compound. Here, the solid ion conductor compound may have an average particle diameter ($D_{50}$) of 2 μm or less. The $D_{50}$ refers to a diameter of particles corresponding to 50 volume % in a cumulative particle size distribution. When the particle diameter $D_{50}$ of the solid ion conductor compound included in the positive electrode active material layer is greater than 2 μm, the dense packing of the particles becomes difficult, and thus the capacity characteristics thereof may be degraded during charging and discharging.

In an embodiment, the electrolyte layer may include the solid ion conductor compound. Here, the solid ion conductor compound may have an average particle diameter $D_{50}$ of 5 μm or less. When the average particle diameter $D_{50}$ of the solid ion conductor compound included in the electrolyte layer is 5 μm or less, the density and uniformity of the electrolyte layer may be improved, and thus the occurrence of defects, such as pinholes or the like, in the electrolyte layer may be suppressed, and as a result, the lifespan characteristics of the cell may be improved.

In an embodiment, both the positive electrode active material layer and the electrolyte layer may include the solid ion conductor compound.

When the electrochemical cell includes the solid ion conductor compound, the lithium-ion conductivity and chemical stability of the electrochemical cell may be improved.

The electrochemical cell may be, for example, an all-solid secondary battery, a liquid electrolyte-containing secondary battery, or a lithium air battery, but is not limited thereto. Any electrochemical cell available in the art may be used.

Hereinafter, an all-solid secondary battery will be described in detail.

[All-Solid Secondary Battery: Type 1]

An all-solid secondary battery may include the aforementioned solid ion conductor compound.

The all-solid secondary battery may include: for example, a positive electrode layer including a positive electrode active material layer; a negative electrode layer including a negative electrode active material layer; and an electrolyte layer disposed between the positive electrode layer and the negative electrode layer, and the positive electrode active material layer and/or the electrolyte layer may include the aforementioned solid ion conductor compound.

The all-solid secondary battery according to an embodiment may be prepared as follows.

(Solid Electrolyte Layer)

First, a solid electrolyte layer may be prepared.

The solid electrolyte layer may be prepared by mixing the aforementioned solid ion conductor compound with a binder and drying a resulting mixture, or by rolling powders of the solid ion conductor compound represented by Formula 1 in a constant shape at a pressure in a range of 1 ton to 10 tons. The aforementioned solid ion conductor compound may be used as the solid electrolyte.

The solid electrolyte may have an average particle diameter in a range of, for example, 0.5 um to 20 um. When the average particle diameter of the solid electrolyte is within the ranges above, the binding properties in the process of forming a sintered body may be improved, and thus the ionic conductivity and lifespan characteristics of the solid electrolyte particles may be improved.

The solid electrolyte layer may have a thickness in a range of 10 um to 200 um. When the thickness of the solid electrolyte layer is within the ranges above, a sufficient movement rate of lithium ions may be ensured, and as a result, the high ionic conductivity may be obtained.

The solid electrolyte layer may further include, in addition to the aforementioned solid ion conductor compound, a solid electrolyte in the art, such as a sulfide-based solid electrolyte and/or an oxide-based solid electrolyte.

The sulfide-based solid electrolyte in the art may include, for example, lithium sulfide, silicon sulfide, phosphorus sulfide, boron sulfide, or a combination thereof. Particles of the sulfide-based solid electrolyte in the art may include $Li_2S$, $P_2S_5$, $SiS_2$, $GeS_2$, $B_2S_3$, or a combination thereof. The particles of the sulfide-based solid electrolyte in the art may include $Li_2S$ or $P_2S_5$. The particles of the sulfide-based solid electrolyte in the art are known to have higher lithium-ion conductivity than other inorganic compounds. For example, the sulfide-based solid electrolyte in the art may include $Li_2S—P_2S_5$. When a sulfide solid electrolyte material constituting the sulfide-based solid electrolyte in the art includes $Li_2S—P_2S_5$, a mixing molar ratio of $Li_2S$ to $P_2S_5$ may be, for example, in a range of about 50:50 to about 90:10. In addition, as the sulfide-based solid electrolyte in the art, an inorganic solid electrolyte prepared by adding $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("ThioLISICON"), $Li_2O—Al_2O_3—TiO_2—P_2O_5$ ("LATP"), or the like to an inorganic solid electrolyte, such as $Li_2S—P_2S_5$, $SiS_2$, $GeS_2$, $B_2S_3$, or a combination thereof. Non-limiting examples of the sulfide-based solid electrolyte material may be: $Li_2S—P_2S_5$; $Li_2S—P_2S_5—LiX$ (where X is a halogen element); $Li_2S—P_2S_5—Li_2O$; $Li_2S—P_2S_5—Li_2O—LiI$; $Li_2S—SiS_2$; $Li_2S—SiS_2—LiI$; $Li_2S—SiS_2—LiBr$; $Li_2S—SiS_2—LiCl$; $Li_2S—SiS_2—B_2S_3—LiI$; $Li_2S—SiS_2—P_2S_5—LiI$; $Li_2S—B_2S_3$; $Li_2S—P_2S_5—Z_mS_n$ (where m and n each indicate a positive number, and Z is Ge, Zn, or Ga); $Li_2S—GeS_2$; $Li_2S—SiS_2—Li_3PO_4$; and $Li_2S—SiS_2—Li_pMO_q$ (where p and q each indicate a positive number, and M is P, Si, Ge, B, Al, Ga, or In). In this regard, the sulfide-based solid electrolyte material in the art may be prepared by treating raw starting substances of the sulfide-based solid electrolyte material (e.g., $Li_2S$, $P_2S_5$, etc.) by a melt quenching method, a mechanical milling method, and the like. Also, a calcination process may be performed after the treatment.

The binder included in the solid electrolyte layer may include, for example, styrene butadiene rubber (SBR), polytetrafluoroethylene, polyvinylidene fluoride, polyethylene, polyvinyl alcohol, or the like, but is not limited thereto. Any material available as a binder in the art may be used. The binder included in the solid electrolyte layer may be the same as or different from a binder included in the positive electrode layer and the negative electrode layer.

(Positive Electrode Layer)

Next, a positive electrode layer may be prepared.

A positive electrode active material layer including a positive electrode active material may be formed on a current collector to prepare the positive electrode layer. Here, the positive electrode active material may have an average particle diameter $D_{50}$ in a range of, for example, 2 um to 10 um.

As the positive electrode active material, any material generally available for a secondary battery in the art may be used without limitation. For example, the positive electrode active material may be lithium transition metal oxide, transition metal sulfide, or the like. For example, at least one composite oxide including lithium and a metal selected from cobalt, manganese, nickel, and a combination thereof may be used, and a specific example thereof is a compound represented by one of the following formulae: $Li_aA_{1-b}B^1_bD^1_2$ (where 0.90≤a≤1.8 and 0≤b≤0.5); $Li_aE_{1-b}B^1_bO_{2-c}D^1_c$ (where 0.90≤a≤1.8, 0≤b≤0.5, and 0≤c≤0.05); $LiE_{2-b}B^1_bO_{4-c}D^1_c$ (where 0≤b≤0.5 and 0≤c≤0.05); $Li_aNi_{1-b-c}Co_bB^1_cD^1_a$ (where 0.90≤a≤1.8, 0≤b≤0.5, 0≤c≤0.05, and 0≤α≤2); $Li_aNi_{1-b-c}Co_bB^1_cO_{2-\alpha}F^1_\alpha$ (where 0.90≤a≤1.8, 0≤b≤0.5, 0≤c≤0.05, and 0<α<2); $Li_aNi_{1-b-c}Co_bB^1_cO_{2-\alpha}F^1_\alpha$ (where 0.90≤a≤1.8, 0≤b≤0.5, 0≤c≤0.05, and 0<α<2); $Li_aNi_{1-b-c}Mn_bB^1_cD^1_a$ (where 0.90≤a≤1.8, 0≤b≤0.5, 0≤c≤0.05, and 0<α<2); $Li_aNi_{1-b-c}Mn_bB_cO_{2-\alpha}F^1_\alpha$ (where 0.90≤a≤1.8, 0≤b≤0.5, 0≤c≤0.05, and 0<α<2); $Li_aNi_{1-b-c}Mn_bB^1_cO_{2-\alpha}F^1_2$ (where 0.90≤a≤1.8, 0≤b≤0.5, 0≤c≤0.05, and 0<α<2); $Li_aNi_bE_cG_dO_2$ (where 0.90≤a≤1.8, 0≤b≤0.9, 0≤c≤0.5, and 0.001≤d≤0.1); $Li_aNi_bCo_cMn_dG_eO_2$ (where 0.90≤a≤1.8, 0≤b≤0.9, 0≤c≤0.5, 0≤d≤0.5, and 0.001≤e≤0.1); $Li_aNiG_bO_2$ (where 0.90≤a≤1.8 and 0.001≤b≤0.1); $Li_aCoG_bO_2$ (where 0.90≤a≤1.8 and 0.001≤b≤0.1); $Li_aMnG_bO_2$ (where 0.90≤a≤1.8 and 0.001≤b≤0.1); $Li_aMn_2G_bO_4$ (where 0.90≤a≤1.8 and 0.001≤b≤0.1); $QO_2$; $QS_2$; $LiQS_2$; $V_2O_5$; $LiV_2O_2$; $LiIO_2$; $LiNiVO_4$; $Li_{(3-f)}J_2(PO_4)_3$ (were 0≤f≤2); $Li_{(3-f)}Fe_2(PO_4)_3$ (0≤f≤2); and $LiFePO_4$. In the formulae above, A may be Ni, Co, Mn, or a combination thereof, $B^1$ may be Al, Ni, Co, Mn, Cr, Fe, Mg, Sr, V, a rare earth element, or a combination thereof, $D^1$ may be O, F, S, P, or a combination thereof, E may be Co, Mn, or a combination thereof, $F^1$ may be F, S, P, or a combination thereof, G may be Al, Cr, Mn, Fe, Mg, La, Ce, Sr, V, or a combination thereof, Q may be Ti, Mo, Mn, or a combination thereof, I may be Cr, V, Fe, Sc, Y, or a combination thereof, and J may be V, Cr, Mn, Co, Ni, Cu, or a combination thereof. For example, the positive electrode active material may be $LiCoO_2$, $LiMn_xO_{2x}$ (where x=1 and 2), $LiNi_{1-x}Mn_xO_{2x}$ (where 0<x<1), $Ni_{1-x-y}Co_xMn_yO_2$ (where 0≤x≤0.5 and 0≤y≤0.5), $Ni_{1-x-y}Co_xAl_yO_2$ (where 0≤x≤0.5 and 0≤y≤0.5), $LiFePO_4$, $TiS_2$, $FeS_2$, $TiS_3$, $FeS_3$, or the like.

A compound having a coating layer may be also added to the surface of the compound described above, and a mixture of the compound described above and a compound having a coating layer may be also used. Such a coating layer added to the surface of the compound described above may include, for example, a coating element compound such as an oxide of a coating element, hydroxide of a coating element, oxyhydroxide of a coating element, oxycarbonate of a coating element, or hydroxy carbonate of a coating element. The compound constituting the coating layer may be amorphous or crystalline. The coating element included in the coating layer may be Mg, Al, Co, K, Na, Ca, Si, Ti, V, Sn, Ge, Ga, B, As, Zr, or a mixture thereof. A method of forming the coating layer may be selected within a range that does not adversely affect the physical properties of the positive electrode active material. The coating method may be, for example, spray coating, dipping method, or the like. A detailed description of the coating method will be omitted because it may be well understood by those in the art.

The positive electrode active material may include, for example, a lithium salt of a transition metal oxide having a layered rock salt type structure, among the lithium transition metal oxides described above. The term "layered rock salt type structure" as used herein may refer to, for example, a structure in which oxygen atomic layers and metal layers are alternately arranged regularly in the <111> direction of a cubic rock salt type structure to form a two-dimensional plane by each of the atomic layers. The term "cubic rock salt type structure" as used herein refers to a NaCl type structure which is one type of crystal structures, and in detail, may refer to a structure in which a face centered cubic lattice (fcc) formed by respective anions and cations is misaligned from each other by ½ of the ridge of a unit lattice. The lithium transition metal oxide having the layered rock salt type structure may be a ternary lithium transition metal oxide, for example, $LiNi_xCo_yAl_zO_2$ (NCA) or $LiNi_xCo_yMn_zO_2$ (NCM) (where 0<x<1, 0<y<1, 0<z<1, and x+y+z=1). When the positive electrode active material includes a ternary lithium transition metal oxide having a layered rock salt type, the all-solid secondary battery may have further improved energy density and thermal stability.

The positive electrode active material may be covered by the coating layer as described above. For use as the coating layer, any coating layer known for a positive electrode active material of an all-solid secondary battery may be used. The coating layer may include, for example, $Li_2O—ZrO_2$ (LZO) and the like.

When the positive electrode active material includes, for example, Ni as the ternary lithium transition metal oxide such as NCA or NCM, the volume density of the all-solid secondary battery increases so that the metal elution of the positive electrode active material may be reduced in a charged state. Consequently, the cycle characteristics of the all-solid secondary battery may be improved.

The positive electrode active material may be in the form of a particle shape, such as a spherical sphere, an elliptical sphere, and the like. A particle diameter $D_{50}$ of the positive electrode active material is not particularly limited, and is within a range applicable to an all-solid secondary battery in the art. An amount of the positive electrode active material in the positive electrode layer is not particularly limited, and is within a range applicable to a positive electrode layer of an all-solid battery in the art. The amount of the positive electrode active material in the positive electrode active material layer may be, for example, in a range of 50 wt % to 95 wt %.

The positive electrode active material layer may further include the aforementioned solid ion conductor compound. For example, the positive electrode active material layer and the solid electrolyte layer may simultaneously include the aforementioned solid ion conductor compound. For example, when the positive electrode active material layer includes the aforementioned solid ion conductor compound, the solid electrolyte layer may not include the aforementioned solid ion conductor compound.

The positive electrode active material layer may include a binder. The binder may include, for example, SBR, polytetrafluoroethylene, polyvinylidene fluoride, polyethylene, and the like.

The positive electrode active material layer may include a conductive material. The conductive material may include, for example, graphite, carbon black (CB), acetylene black (AB), ketjen black (KB), carbon fiber, metal powder, or the like.

The positive electrode active material layer may further include, for example, an additive such as a filler, a coating agent, a dispersant, an ion conductive auxiliary agent, and the like, in addition to the positive electrode active material, the solid electrolyte, the binder, and the positive electrode active material.

For use as the filler, the coating agent, the dispersant, the ion conductive auxiliary agent, and the like that may be included in the positive electrode active material layer, a known material generally used for an electrode of an all-solid battery may be used.

As the positive electrode current collector, for example, a plate or a foil, consisting of aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof, may be used. The positive electrode current collector may be omitted.

The positive electrode current collector may further include a carbon layer disposed on one surface or both surfaces of the metal substrate. When the carbon layer is additionally disposed on the metal substrate, a metal of the metal substrate may be prevented from being corroded by a solid electrolyte included in a positive electrode layer, and the interfacial resistance between the positive electrode active material layer and the positive electrode current collector may be reduced. A thickness of the carbon layer may be, for example, in a range of about 1 m to about 5 m. When the carbon layer is too thin, the contact between the metal substrate and the solid electrolyte may not be completely blocked. When the carbon layer is too thick, the energy density of an all-solid battery may be reduced. The carbon layer may include amorphous carbon, crystalline carbon, or the like.

(Negative Electrode Layer)

Next, a negative electrode layer may be prepared.

The negative electrode layer may be prepared in the same manner as in the positive electrode layer, except that a negative electrode active material is used instead of the positive electrode active material. A negative electrode active material layer including a negative electrode active material may be formed on a negative electrode current collector to prepare the negative electrode layer.

The negative electrode active material layer may further include the aforementioned solid ion conductor compound.

The negative electrode active material may include a lithium metal, a lithium metal alloy, or a combination thereof.

The negative electrode active material layer may further include, in addition to the lithium metal, the lithium metal alloy, or a combination thereof, a negative electrode active material in the art. The negative electrode active material in the art may include, for example, at least one selected from the group consisting of a metal alloyable with lithium, a transition metal oxide, a non-transition metal oxide, and a carbon-based material. Examples of the metal alloyable with lithium include silver (Ag), silicon (Si), tin (Sn), aluminum (Al), germanium (Ge), lead (Pb), bismuth (Bi), antimony (Sb), a Si—Y alloy (where Y is an alkali metal, an alkaline earth metal, a Group 13 element, a Group 14 element, a transition metal, a rare earth element, or a combination thereof, and Y is not Si), a Sn—Y alloy (where Y is an alkali metal, an alkaline earth-metal, a Group 13 element, a Group 14 element, a transition metal, a rare earth element, or a combination thereof, and Y is not Sn), and the like. The element Y may be, for example, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. The transition metal oxide may include, for example, a lithium titanium oxide, a vanadium oxide, a lithium vanadium oxide, and the like. The non-transition metal oxide may include, for example, $SnO_2$, SiOx (where $0<x<2$), and the like. The carbon-based material may include, for example, crystalline carbon, amorphous carbon, or a mixture thereof. The crystalline carbon may be graphite, such as natural graphite or artificial graphite, that is amorphous or in a laminaris, flake, spherical, or fiber form. The amorphous carbon may include soft carbon (low-temperature calcined carbon), hard carbon (hard carbon), mesophase pitch carbide, calcined coke, and the like.

Figure 7:
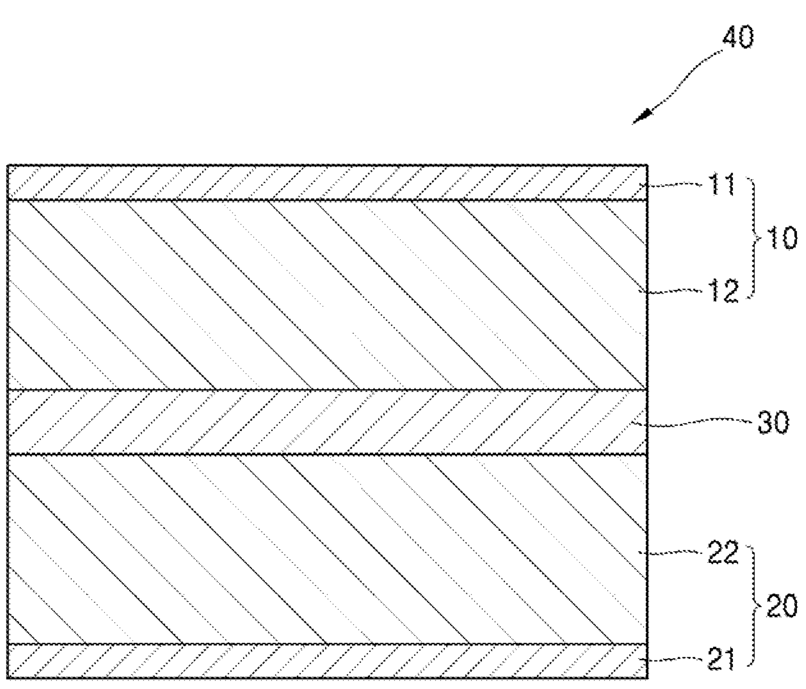
FIG. 7 is a schematic diagram of an all-solid secondary battery according to an embodiment.

Referring to FIG. 7, an all-solid secondary battery 40 according to an embodiment includes a solid electrolyte layer 30 a positive electrode layer 10 disposed on one surface of the solid electrolyte layer 30, and a negative electrode layer 20 disposed on the other surface of the solid electrolyte layer 30. The positive electrode layer 30 includes a positive electrode active material layer 12 in contact with the solid electrolyte layer 30 and a positive electrode current collector 11 in contact with the positive electrode active material layer 12, and the negative electrode layer 20 includes a negative electrode active material layer 22 in contact with the solid electrolyte layer 30 and a negative electrode current collector 11 in contact with the negative electrode active material layer 22. In an embodiment, the formation of the all-solid secondary battery 40 may be completed in a way that, for example, the positive electrode active material layer 12 and the negative electrode active material layer 22 are respectively formed on both surfaces of the solid electrolyte layer 30, and then the positive electrode current collector 11 and the negative electrode current collector 21 are respectively formed the positive electrode active material layer 12 and the negative electrode active material layer 22. In one or more embodiments, the formation of the all-solid secondary battery 40 may be completed in a way that, for example, on the negative electrode current collector 21, the negative electrode active material layer 22, the solid electrolyte layer 30, the positive electrode active material layer 12, and the positive electrode current collector 11 are sequentially stacked in the stated order.

[All-Solid Secondary Battery: Type 2]

Figure 8:
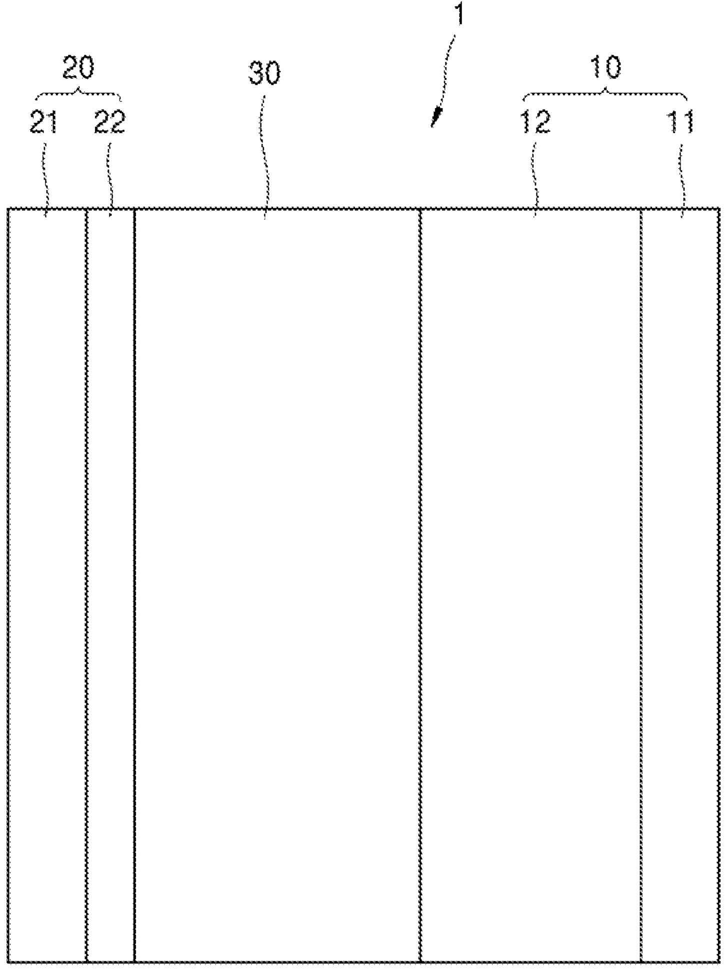
FIG. 8 is a schematic diagram of an all-solid secondary battery according to another embodiment.
Figure 9:
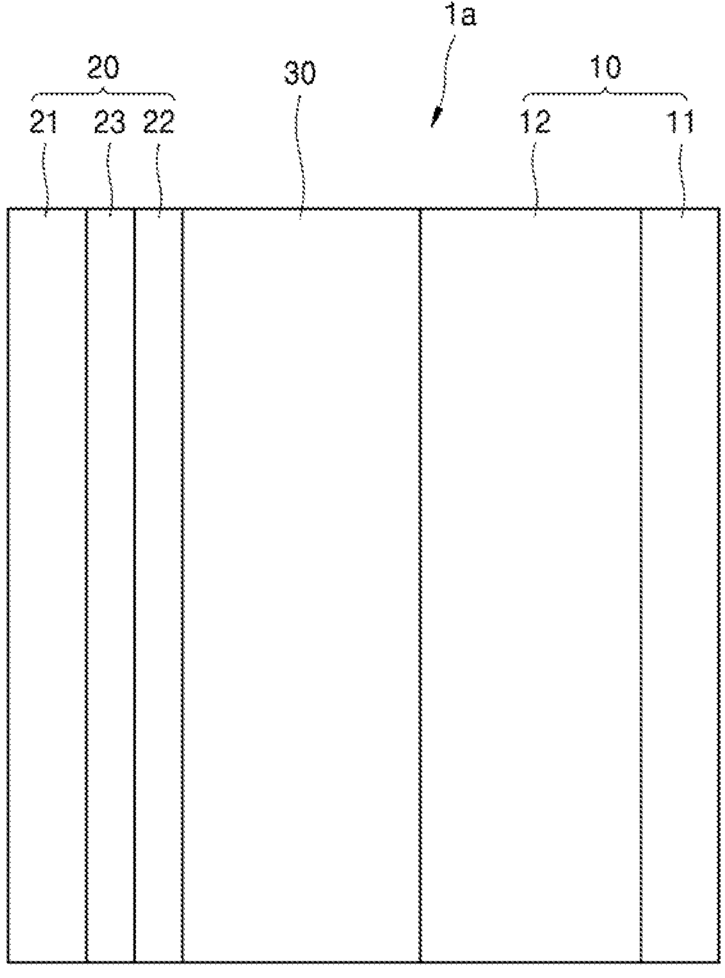
FIG. 9 is a schematic diagram of an all-solid secondary battery according to another embodiment.

Referring to FIGS. 8 and 9, the all-solid secondary battery 1 includes: for example, the positive electrode layer 10 including the positive electrode active material layer 12 disposed on the positive electrode current collector 11; the negative electrode layer 20 including the negative electrode active material layer 22 disposed on a negative electrode current collector 21; and the electrolyte layer 30 disposed between the positive electrode layer 10 and the negative electrode layer 20, wherein the positive electrode active material layer 12 and/or the electrolyte layer 30 includes the aforementioned solid ion conductor compound.

An all-solid secondary battery according to another embodiment may be manufactured as follows.

A positive electrode layer and a solid electrolyte layer are respectively manufactured in the same manner as in those included the aforementioned all-solid secondary battery.

(Negative layer)

Next, a negative electrode layer may be prepared.

Referring to FIGS. 8 and 9, the negative electrode layer 20 includes the negative electrode current collector 21 and the negative electrode active material layer 22 disposed on the negative electrode current collector 21, and the negative electrode active material layer 22 may include, for example, a negative electrode active material and a binder.

The negative electrode active material included in the negative electrode active material layer 22 may have, for example, a particle shape. An average particle diameter of the negative electrode active material having a particle shape may be, for example, less than or equal to about 4 m, less than or equal to about 2 m, less than or equal to about 1 m, or less than or equal to about 900 nm. For example, an average particle diameter of the negative electrode active material having a particle shape may be, for example, in a range of about 10 nm to about 4 um, about 10 nm to about 3 um, about 10 nm to about 2 um, about 10 nm to about 1 um, or about 10 nm to about 900 nm. When the negative electrode active material has the average particle diameter within the ranges above, lithium may be more easily subjected to reversible absorbing and/or desorbing during charging and discharging. The average particle diameter of the negative electrode active material may be, for example, a median diameter D50 measured by using a laser particle size distribution meter.

The negative electrode active material included in the negative electrode active material layer 22 may include, for example, at least one selected from a carbon-based negative electrode active material and a metallic or metalloid negative electrode active material.

The carbon-based negative electrode active material may be, in particular, amorphous carbon. The amorphous carbon may include, for example carbon black (CB), acetylene black (AB), furnace black (FB), ketjen black (KB), graphene, or the like, but is not necessarily limited thereto. Any material categorized as amorphous carbon in the art may be used. The amorphous carbon is carbon that has no or very low crystallinity, and in this regard, may be distinguished from crystalline carbon or graphite-based carbon.

The metallic or metalloid negative electrode active material may include at least one selected from gold (Au), platinum (Pt), palladium (Pd), silicon (Si), silver (Ag), aluminum (Al), bismuth (Bi), tin (Sn), and zinc (Zn), but is not necessarily limited thereto. Any material available as a metallic negative electrode active material or metalloid negative electrode active material capable of forming an alloy or compound with lithium in the art may be used. For example, since nickel (Ni) does not form an alloy with lithium, Ni is not a metallic negative electrode active material.

The negative electrode active material layer 22 may include one type of the negative electrode active material from among the negative electrode active materials described above, or a mixture of multiple negative electrode active materials that are different from each other. In an embodiment, the negative electrode active material layer 22 may include only amorphous carbon, or may include at least one selected from Au, Pt, Pd, Si, Ag, Al, Bi, Sn, and Zn. In one or more embodiments, the negative electrode active material layer 22 may include a mixture of amorphous carbon with at least one selected from Au, Pt, Pd, Si, Ag, Al, Bi, Sn, and Zn. Here, a mixing ratio of the amorphous carbon to Au or the like in the mixture may be, for example, in a range of about 10:1 to about 1:2, about 5:1 to about 1:1, or about 4:1 to about 2:1, but is not necessarily limited thereto. The mixing ratio may be determined depending on the characteristics of the required all-solid secondary battery. When the negative electrode active material has such a composition, the cycle characteristics of the all-solid secondary battery may be further improved.

The negative electrode active material included in the first negative electrode active material layer 22 may include, for example, a mixture of a first particle consisting of amorphous carbon and a second particle consisting of a metal or metalloid. The metal or metalloid may include, for example, Au, Pt, Pd, Si, Ag, Al, Bi, Sn, Zn, and the like. The metalloid may be, in other words, a semiconductor. An amount of the second particle may be in a range of about 8 wt % to about 60 wt %, about 10 wt % to about 50 wt %, about 15 wt % to about 40 wt %, or about 20 wt % to about 30 wt %, based on the total weight of the mixture. When the amount of the second particle is within the ranges above, the cycle characteristics of the all-solid secondary battery may be further improved.

The binder included in the negative electrode active material layer 22 may include, for example, SBR, polytetrafluoroethylene, polyvinylidene fluoride, polyethylene, vinylidene fluoride/hexafluoropropylene copolymer, polyacrylonitrile, polymethyl methacrylate, or the like, but is not necessarily limited thereto. Any material available as a binder in the art may be used. The binder may be used alone, or may be used with multiple binders that are different from each other.

When the negative electrode active material layer 22 includes the binder, the negative electrode active material layer 22 may be stabilized on the negative electrode current collector 21. In addition, despite a change in volume and/or relative position of the negative electrode active material layer 22 during charging and discharging, cracking of the negative electrode active material layer 22 may be suppressed. For example, when the negative electrode active material layer 22 does not include the binder, the negative electrode active material layer 22 may be easily separated from the negative electrode current collector 21. At a portion where the negative electrode current collector 21 is exposed by the separation of the negative electrode active material layer 22 from the negative electrode current collector 22, the possibility of occurrence of a short circuit may increase as the negative electrode current collector 21 is in contact with the electrolyte layer 30. The negative electrode active material layer 22 may be prepared by, for example, coating the negative electrode current collector 21 with a slurry in which a material constituting the negative electrode active material layer 22 is dispersed, and then drying the coated negative electrode current collector 21. When the negative electrode active material layer 22 includes the binder, the negative electrode active material may be stably dispersed in the slurry. For example, when the negative electrode current collector 21 is coated with the slurry by a screen printing method, clogging of the screen (for example, clogging by an agglomerate of the negative electrode active material) may be suppressed.

The negative electrode active material layer 22 may further include additives, for example, a filler, a coating agent, a dispersant, an ionic conductive auxiliary agent, or the like, as used in the all-solid secondary battery 1 in the art.

A thickness of the negative electrode active material layer 22 may be, for example, less than or equal to about 50%, less than or equal to about 40%, less than or equal to about 30%, less than or equal to about 20%, less than or equal to about 10%, or less than or equal to about 5%, of the thickness of the positive electrode active material layer 12. The thickness of the negative electrode active material layer 22 may be, for example, in a range of about 1 m to about 20 m, about 2 m to about 10 m, or about 3 m to about 7 m. When the negative electrode active material layer 22 is too thin, lithium dendrites formed between the negative electrode active material layer 22 and the negative electrode current collector 21 may collapse the negative electrode active material layer 22, and thus the cycle characteristics of the all-solid secondary battery 1 may be difficult to improve. When the negative electrode active material layer 22 is too thick, the energy density of the all-solid secondary battery 1 may be lowered and the internal resistance of the all-solid battery 1 by the negative electrode active material layer 22 may increase, and thus the cycle characteristics of the all-solid secondary battery 1 may be difficult to improve.

When the thickness of the negative electrode active material layer 22 is reduced, for example, charging capacity of the negative electrode active material layer 22 may be also reduced. The charging capacity of the negative electrode active material layer 22 may be, for example, less than or equal to about 50%, less than or equal to about 40%, less than or equal to about 30%, less than or equal to about 20% or, less than or equal to about 10%, or less than or equal to about 5%, with respect to the charging capacity of the positive electrode active material layer 12. The charging capacity of the negative electrode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 20% with respect to the charging capacity of the positive electrode active material layer 12. When the charging capacity of the negative electrode active material layer 22 is significantly small, the negative electrode active material layer 22 becomes very thin. In this regard, lithium dendrites formed between the negative electrode active material layer 22 and the negative electrode current collector 21 during a repeated process of charging and discharging may collapse the negative electrode active material layer 22, and thus the cycle characteristics of the all-solid secondary battery 1 may be difficult to improve. When the charging capacity of the first negative electrode active material layer 22 is excessively increased, the energy density of the all-solid secondary battery 1 may be lowered and the internal resistance of the all-solid secondary battery 1 by the first negative electrode active material layer 22 may be increased, so that the cycle characteristics of the all-solid secondary battery 1 may be difficult to improve.

The charging capacity of the positive electrode active material layer 12 may be obtained by multiplying the charging capacity density (mAh/g) of the positive electrode active material by the mass of the positive electrode active material in the positive electrode active material layer 12. When several types of the positive electrode active material are used, for each positive electrode active material, the charging capacity density is multiplied by the mass, and the sum of these values is the charging capacity of the positive electrode active material layer 12. The charging capacity of the negative electrode active material layer 22 may be calculated in the same way. That is, the charging capacity of the negative electrode active material layer 22 may be obtained by multiplying the charging capacity density (mAh/g) of the negative electrode active material 22 by the mass of the negative electrode active material in negative electrode active material layer 22. When several types of the negative electrode active material are used, for each negative electrode active material, the charging capacity density is multiplied by the mass, and the sum of these values is the charging capacity of the negative electrode active material layer 22. Here, the charge capacity densities of the positive electrode active material and the negative electrode active material are capacities estimated by using an all-solid half-cell using lithium metal as a counter electrode. The charging capacities of the positive electrode active material layer 12 and the negative electrode active material layer 22 may be directly measured by measuring the charging capacity obtained by using the all-solid half-cell. When the measured charging capacity is divided by the mass of each active material, the charging capacity density is obtained. In an embodiment, the charging capacities of the positive electrode active material layer 12 and the negative electrode active material layer 22 may be initial charging capacities measured during the first cycle of charging.

Referring to FIG. 9, an all-solid secondary battery 1*a* may further include, for example, a metal layer 23 disposed between the negative electrode current collector 21 and the negative electrode active material layer 22. The metal layer 12 may include Li or a Li alloy. Thus, the metal layer 23 may act as, for example, a Li reservoir. The Li alloy may include, for example, a Li—Al alloy, a Li—Sn alloy, a Li—In alloy, a Li—Ag alloy, a Li—Au alloy, a Li—Zn alloy, a Li—Ge alloy, a Li—Si alloy, or the like, but is not limited thereto. Any material alloyable with Li in the art may be used. The metal layer 23 may consist of one of these alloys or lithium, or may consist of several types of alloy.

A thickness of the material layer 23 is not particularly limited, but may be, for example, in a range of about 1 um to about 1,000 um, about 1 um to about 500 um, about 1 um to about 200 um, about 1 um to about 150 um, about 1 um to about 100 um, or about 1 um to about 50 um. When the metal layer 23 is too thin, the metal layer 23 may have a difficulty in performing a function as a Li reservoir. When the metal layer 23 is too thick, the mass and volume of the all-solid secondary battery 1*a* may be increased, and thus the cycle characteristics of the all-solid battery 1*a* may be rather degraded. The metal layer 23 may be, for example, a metal foil having a thickness within the ranges above.

In the all-solid secondary battery 1*a*, the metal layer 23 may be, for example, disposed between the negative electrode current collector 21 and the negative electrode active material layer 22 before assembly of the all-solid secondary battery 1*a*, or may be precipitated between the negative electrode current collector 21 and the negative electrode active material layer 22 by charging after assembly of the all-solid secondary battery 1*a*. When the metal layer 23 is disposed between the negative electrode current collector 21 and the negative electrode active material layer 22 before assembly of the all-solid secondary battery 1*a*, the metal layer 23, which includes Li, may serve as a Li reservoir. For example, a Li foil may be disposed between the negative electrode current collector 21 and the negative electrode active material layer 22 before assembly of the all-solid secondary battery 1*a*. Accordingly, the cycle characteristics of the all-solid secondary battery 1*a* including the metal layer 23 may be further improved. When the metal layer 23 is precipitated by charging after assembly of the all-solid secondary battery 1*a*, the energy density of the all-solid secondary battery 1*a*, which does not include the metal layer 23 at the time of assembly of the all-solid secondary battery 1*a*, may increase. For example, during charging of the all-solid battery 1, the all-solid secondary battery 1 may be charged in excess of the charging capacity of the negative electrode active material layer 22. That is, the negative electrode active material layer 22 may be overcharged. At the beginning of charging, Li may be adsorbed onto the negative electrode active material layer 22. The negative electrode active material included in the negative electrode active material layer 22 may form then form an alloy or compound with Li ions that have transported from the positive electrode layer 10. When the charging is performed in excess of the capacity of the negative electrode active material layer 22, for example, Li may be precipitated on a rear surface of the negative electrode active material layer 22, i.e., a surface between the negative electrode current collector 21 and the negative electrode active material layer 22, and due to the precipitated Li, a metal layer corresponding to the metal layer 23 may be formed. The metal layer 23 may be a metal layer mainly composed of lithium (i.e., lithium metal). Such a result may be obtained, for example, when the negative electrode active material included in the negative electrode active material layer 22 consists of a material that forms an alloy or compound with Li. During discharging, Li included in the negative electrode active material layer 22 and the metal layer 23 may be ionized and migrate toward the positive electrode layer 10. In this regard, Li may be used as the negative electrode active material in the all-solid secondary battery 1*a*. In addition, since the negative electrode active material layer 22 coats the metal layer 23, the negative electrode active material layer 22 may serve as a protective layer for the metal layer 23, and at the same time, may serve to suppress the precipitation growth of lithium dendrites. Therefore, the short circuit and the capacity degradation of the all-solid secondary battery 1*a* may be suppressed, and consequently, the cycle characteristics of the all-solid battery 1 may be improved. In addition, when the metal layer 23 is disposed by charging after assembly of the all-solid secondary battery 1*a*, the negative electrode current collector 21, the negative electrode active material layer 22, and a region therebetween may be, for example, Li-free regions that do not include Li in an initial state or a post-discharge state of the all-solid secondary battery 1*a*.

The negative electrode current collector 21 may be formed of, for example, a material that does not react with Li, that is, a material that forms neither an alloy nor a compound with Li. A material for forming the negative electrode current collector 21 may be, for example, copper (Cu), stainless steel, titanium (Ti), iron (Fe), cobalt (Co), nickel (Ni), and the like, but is not limited thereto. Any material available as an electrode current collector in the art may be used. The negative electrode current collector 21 may be formed of one of the above-described metals, an alloy of two or more of the above-described metals, or a coating material. The negative electrode current collector 21 may be, for example, in the form of a plate or foil.

The all-solid secondary battery 1 may further include, for example, a thin film, which includes an element capable of forming an alloy with Li, on the negative electrode current collector 21. The thin film may be disposed between the negative electrode current collector 21 and the negative electrode active material layer 22. The thin film may include, for example, an element capable of forming an alloy with Li. The element capable of forming an alloy with lithium may include, for example, gold, silver, zinc, tin, indium, silicon, aluminum, bismuth, and the like, but is not necessarily limited thereto. Any material available as an element capable of forming an alloy with lithium in the art may be used. The thin film may be formed of one of these metals or an alloy of several types of metals. By disposing the thin-film 24 on the negative electrode current collector 21, for example, a precipitation shape of the metal layer 23 precipitated between the thin film 24 and the negative electrode active material layer 22 may be further flattened, and accordingly, the cycle characteristics of the all-solid secondary battery 1 may be further improved.

A thickness of the thin film 24 may be, for example, in a range of about 1 nm to about 800 nm, about 10 nm to about 700 nm, about 50 nm to about 600 nm, or about 100 nm to about 500 nm. When the thickness of the thin film 24 is less than 1 nm, the thin film may have a difficulty in exhibiting a function thereof. When the thin film is too thick, the thin film 24 itself may adsorb Li so that an amount of Li precipitated in the negative electrode may be decreased, and accordingly, the energy density and the cycle characteristics of the all-solid secondary battery 1 may be degraded. The thin film may be disposed on the negative electrode current collector 21, 21*a*, or 21*b* by, for example, a vacuum deposition method, a sputtering method, a plating method, or the like, but is not necessarily limited thereto, Any method capable of forming a thin film in the art may be used.

A method of manufacturing the solid ion conductor compound according to another aspect provides: providing a mixture by contacting a lithium precursor compound, a compound including an element of Na, K, Rb, Cs, or Fr, or a combination thereof, a compound including phosphorus (P), a compound including Cl, and a compound including at least one of an element Br and an element I; and performing heat treatment on the mixture in an inert atmosphere to provide a solid ion conductor compound. The solid ion conductor compound may be the aforementioned solid ion conductor compound.

The lithium precursor compound may include lithium sulfide. For example, the lithium precursor compound may be $Li_2S$.

The compound including the element of Na, K, Rb, Cs, or Fr or a combination thereof may be a halide or sulfide compound of Na, K, Rb, Cs, or Fr, or a combination thereof. For example, the compound including the element of Na, K, Rb, Cs, Fr or a combination thereof may be NaCl, KCl, NaBr, KI, $Na_2S$, $K_2S$, $Rb_2S$, and the like.

The compound including P may include lithium sulfide. For example, the compound including P may be $P_2S_5$ or the like.

The compound including Cl may be, for example, LiCl.

The compound including at least one of the element Br and the element I may include, for example, LiBr or LiI.

In an embodiment, the mixture may further include, a compound including the element of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, or Bi, or a combination thereof, and for example, may include sulfide including at least one of the elements above. For example, the mixture may include $GeS_2$ or the like.

Such compounds may be prepared by contacting starting materials in an appropriate amount, for example, a stoichiometric amount, to form a mixture, and performing heat treatment on the mixture. The contacting may include, for example, milling including ball milling, or pulverization.

The mixture of precursors mixed in a stoichiometric composition may be heat-treated in an inert atmosphere to prepare a solid ion conductor compound.

The heat treatment may be performed at a temperature, for example, in a range of 400° C. to 700° C., 400° C. to 650° C., 400° C. to 600° C., 400° C. to 550° C., or 400° C. to 500° C. The heat treatment may be performed for, for example, 1 hour to 36 hours, 2 hours to 30 hours, 4 hours to 24 hours, 10 hours to 24 hours, or 16 hours to 24 hours. The inert atmosphere is an atmosphere containing inert gas. The inert gas may include, for example, nitrogen, argon, or the like, but is not necessarily limited thereto. Any inert gas used in the art may be used.

Hereinafter, the creative idea of the present invention will be described in more detail through Examples and Comparative Examples below. However, these examples are provided to represent the creative idea, and the scope of the present creative idea is not limited thereto.

(Preparation of solid ion conductor compound)

Example 1: $Li_{5.6}Na_{0.05}PS_{4.65}Cl_{1.25}I_{0.1}$

In a glove box in an Ar atmosphere, $Li_2S$ as a lithium precursor, $P_2S_5$ as a P precursor, $Na_2S$ as a Na precursor, LiCl as a Cl precursor, and LiI as an I precursor were mixed in a stoichiometric ratio to obtain a target composition, $Li_{5.6}Na_{0.05}PS_{4.65}Cl_{1.25}I_{0.1}$. Then, by using a planetary ball mill including zirconia (YSZ) balls in an Ar atmosphere, the precursors were pulverized and mixed at 100 rpm for 1 hour, and then sequentially pulverized and mixed at 800 rpm for 30 minutes to obtain a mixture. The obtained mixture was pressured by a uniaxial pressure to prepare a pellet having a thickness of about 10 mm and a diameter of about 13 mm. The prepared pellet was coated with a gold foil and placed in a carbon crucible, and the carbon crucible was vacuum-sealed with a quartz glass tube. The vacuum-sealed pellet was heated in an electric furnace by raising a temperature from room temperature up to 500° C. at a rate of 1.0° C./minute, heat-treated at 500° C. for 12 hours, and then, cooled to room temperature at 1.0° C./minute to prepare a solid ion conductor compound.

The composition of the prepared solid ion conductor compound was $Li_{5.6}Na_{0.05}PS_{4.65}Cl_{1.25}I_{0.1}$ (wherein a ratio of Na substituted in the Li site was 0.05 and a ratio of the total halogen elements substituted in the S site was 1.35 (e.g., Cl:I=12.5:1)).

Example 2: $Li_{5.47}Na_{0.03}PS_{4.5}Cl_{1.4}I_{0.1}$

A solid ion conductor compound having a composition of $Li_{5.47}Na_{0.03}PS_{4.5}Cl_{1.4}I_{0.1}$ (wherein a ratio of Na substituted in the Li site was 0.03 and a ratio of the total halogen elements substituted in the S site was 1.5 (e.g., Cl:I=14:1)) was prepared in the same manner as in Example 1, except that the stoichiometric mixing ratio of starting materials was changed so that a ratio of Na substituted in the Li site was 0.03 and a ratio of total halogen elements substituted in the S site was 1.5 (e.g., Cl:I=14:1).

Example 3: $Li_{5.47}Na_{0.03}PS_{4.5}Cl_{1.4}Br_{0.1}$

A solid ion conductor compound having a composition of $Li_{5.47}Na_{0.03}PS_{4.5}Cl_{1.4}Br_{0.1}$ (wherein a ratio of Na substituted in the Li site was 0.03 and a ratio of the total halogen elements substituted in the S site was 1.5 (e.g., Cl:Br=14:1)) was prepared in the same manner as in Example 1, except that the stoichiometric mixing ratio of starting materials was changed so that a ratio of Na substituted in the Li site was 0.03, a brome (Br) precursor, LiBr, was used instead of an iodine (I) precursor, and a ratio of total halogen elements substituted in the S site was 1.5 (e.g., Cl:Br=14:1).

Example 4: $Li_{5.37}Na_{0.03}PS_{4.4}Cl_{1.4}Br_{0.2}$

A solid ion conductor compound having a composition of $Li_{5.37}Na_{0.03}PS_{4.4}Cl_{1.4}Br_{0.2}$ (wherein a ratio of Na substituted in the Li site was 0.03 and a ratio of the total halogen elements substituted in the S site was 1.6 (e.g., Cl:Br=7:1)) was prepared in the same manner as in Example 1, except that the stoichiometric mixing ratio of starting materials was changed so that a ratio of Na substituted in the Li site was 0.03, LiBr as a Br precursor was used instead of an I precursor, and a ratio of total halogen elements substituted in the S site was 1.6 (e.g., Cl:Br=7:1).

Example 5: $Li_{5.57}Na_{0.03}P_{0.9}Ge_{0.1}S_{4.5}ClBr_{0.5}$

In a glove box in an Ar atmosphere, $Li_2S$ as a lithium precursor, $P_2S_5$ as a P precursor, $Na_2S$ as a Na precursor, GeS as a Ge precursor, LiCl as a Cl precursor, and LiBr as a Br precursor were mixed in a stoichiometric ratio to obtain a target composition, $Li_{5.57}Na_{0.03}P_{0.9}Ge_{0.1}S_{4.5}ClBr_{0.5}$. Then, by using a planetary ball mill including zirconia (YSZ) balls in an Ar atmosphere, the precursors were pulverized and mixed at 100 rpm for 1 hour, and then sequentially pulverized and mixed at 800 rpm for 30 minutes to obtain a mixture. The obtained mixture was pressured by a uniaxial pressure to prepare a pellet having a thickness of about 10 mm and a diameter of about 13 mm. The prepared pellet was coated with a gold foil and placed in a carbon crucible, and the carbon crucible was vacuum-sealed with a quartz glass tube. The vacuum-sealed pellet was heated in an electric furnace by raising a temperature from room temperature up to 500° C. at a rate of 1.0° C./minute, heat-treated at 500° C. for 12 hours, and then, cooled to room temperature at 1.0° C./minute to prepare a solid ion conductor compound.

The composition of the prepared solid ion conductor compound was $Li_{5.57}Na_{0.03}P_{0.9}Ge_{0.1}S_{4.5}ClBr_{0.5}$ (wherein a ratio of Na substituted in the Li site was 0.03 and a ratio of Ge substituted in the P site was 0.1 (e.g., Cl:Br=2:1)).

Example 6: $Li_{5.37}Na_{0.03}PS_{4.4}Cl_{0.8}Br_{0.8}$

A solid ion conductor compound having a composition of $Li_{5.37}Na_{0.03}PS_{4.4}Cl_{0.8}Br_{0.8}$ (wherein a ratio of Na substituted in the Li site was 0.03 and a ratio of the total halogen elements substituted in the S site was 1.6 (e.g., Cl:Br=1:1)) was prepared in the same manner as in Example 1, except that the stoichiometric mixing ratio of starting materials was changed so that a ratio of Na substituted in the Li site was 0.03, LiBr as a Br precursor was used instead of an I precursor, and a ratio of total halogen elements substituted in the S site was 1.6 (e.g., Cl:Br=1:1).

Comparative Example 1: $Li_6PS_5Cl$

A solid ion conductor compound was prepared in the same manner as in Example 1, except that $Na_2S$ and LiI were not added and the stoichiometric mixing ratio of starting materials was changed to obtain a target composition of $Li_6PS_5Cl$.

The composition of the solid ion conductor compound was $Li_6PS_5Cl$.

Comparative Example 2: $Li_{5.4}PS_{4.4}Cl_{1.6}$

A solid ion conductor compound was prepared in the same manner as in Example 1, except that $Na_2S$ and LiI were not added and the stoichiometric mixing ratio of starting materials was changed to obtain a target imposition of $Li_{5.4}PS_{4.4}Cl_{1.6}$.

The composition of the solid ion conductor compound was $Li_{5.4}PS_{4.4}Cl_{1.6}$.

Comparative Example 3: $Li_{5.37}Na_{0.03}PS_{4.4}Cl_{0.2}Br_{1.4}$

A solid ion conductor compound was prepared in the same manner as in Example 1, except that LiBr was used and the stoichiometric mixing ratio of starting materials was changed to obtain a target composition of $Li_{5.37}Na_{0.03}PS_{4.4}Cl_{0.2}Br_{1.4}$.

The composition of the solid ion conductor compound was $Li_{5.37}Na_{0.03}PS_{4.4}Cl_{0.2}Br_{1.4}$.

Comparative Example 4: $Li_{5.37}Na_{0.03}PS_{4.4}Cl_{1.6}$

A solid ion conductor compound was prepared in the same manner as in Example 1, except that LiI was not added and the stoichiometric mixing ratio of starting materials was changed to obtain a target imposition of $Li_{5.37}Na_{0.03}PS_{4.4}Cl_{1.6}$.

The composition of the solid ion conductor compound was $Li_{5.37}Na_{0.03}PS_{4.4}Cl_{1.6}$.

Comparative Example 5: $Li_{5.4}PS_{4.4}Cl_{1.4}Br_{0.2}$

A solid ion conductor compound was prepared in the same manner as in Example 1, except that $Na_2S$ was not added, LiBr was used instead of LiI, and the stoichiometric mixing ratio of starting materials was changed to obtain a target composition of $Li_{5.4}PS_{4.4}Cl_{1.4}Br_{0.2}$.

The composition of the solid ion conductor compound was $Li_{5.4}PS_{4.4}Cl_{1.4}Br_{0.2}$.

Example 7: Preparation of all-Solid Secondary Battery (Preparation of Positive Electrode Layer)

By pulverizing the solid ion conductor compound prepared according to Example 1 in a pot mill at 150 rpm for 15 hours, a solid electrolyte for a positive electrode having an average particle diameter $D_{50}$ in a range of 1 μm to 2 μm was prepared. The solid electrolyte for a positive electrode, as a counter positive electrode active material consisting of $LiNi_{0.8}Co_{0.15}Al_{0.05}O_2$ (NCA)($D_{50}$=14 μm), a small-sized positive electrode active material consisting of $LiNi_{0.8}Co_{0.15}Al_{0.05}O_2$ (NCA)($D_{50}$=5 μm), a carbon nanofiber as a conductive material, and polytetrafluoroethylene as a binder were mixed to form a mixture, and xylene was added thereto to obtain a positive electrode layer composition. The positive electrode layer composition was kneaded and molded into a sheet form to prepare a positive electrode sheet. The mixing ratio of the counter positive electrode active material and the small-sized positive electrode active material was 3:1, and the mixing weight ratio of the positive electrode active material, the conductive material, the binder, and the solid electrolyte was 84:0.2:1.0:14.8. The positive electrode sheet was pressed onto a positive electrode current collector of an aluminum foil having a thickness of 18 μm and placed in a batch-type oil chamber. Then, a warm isostactic press process of applying a pressure of 500 mPa was performed thereon to form a compressed positive electrode layer.

(Preparation of Electrolyte Layer)

By pulverizing the solid ion conductor compound prepared according to Example 1 in a pot mill at 150 rpm for 8 hours, an electrolyte powder having an average particle diameter $D_{50}$ in a range of 3 μm to 4 μm was prepared. An acrylic resin as a binder was added thereto so that a mixture in which the electrolyte powder and the binder were mixed at 98.5:1.5 was prepared. IBIB as a solvent was added to the mixture and stirred to prepare a composition for forming an electrolyte layer. The composition for forming a solid electrolyte layer was placed on a polyethylene nonwoven fabric, and by moving a blade, a sheet-type solid electrolyte layer formed on the polyethylene nonwoven fabric was prepared by drying at 25° C. in the air for 12 hours and vacuum-drying at 70° C. for 2 hours.

(Preparation of Negative Electrode Layer)

As a negative electrode current collector, an SUS foil (thickness: 10 μm) was prepared. A negative electrode active material was prepared by mixing silver (primary particle diameter: 60 nm) and carbon black powder (primary particle diameter: 35 nm) at a weight ratio of 25:75. In a container, based on a negative electrode layer, 7 wt % of N-methylpyrrolidone (NMP) was added together with the mixture of silver (primary particle diameter: 60 nm) and carbon black powder (primary particle diameter: 35 nm) and polyvinylidenefluoride as the binder, and the stirred to prepare a slurry for forming a negative electrode layer. The SUS foil was coated with the slurry for forming a negative electrode layer by using a blade coater, dried at 80° C. in the air for 20 minutes, and vacuum-dried at 100° C. for 12 hours to prepare a negative electrode layer.

(Preparation of all-Solid Secondary Battery)

The positive electrode layer, the electrolyte layer, and the negative electrode layer prepared according to the aforementioned process were sequentially stacked, and at 85° C., a warm isostactic press process was performed thereon with a pressure of 500 MPa for about 30 minutes to prepare an all-solid secondary battery.

Examples 8 to 12

Each all-solid secondary battery was prepared in the same manner as in Example 7, except that the solid electrolyte powder of each of Examples 2 to 6 was used instead of the solid electrolyte powder of Example 1.

Comparative Examples 6 to 10

Each all-solid secondary battery was prepared in the same manner as in Example 7, except that the solid electrolyte powder of each of Comparative Examples 1 to 5 was used instead of the solid electrolyte powder of Example 1.

Evaluation Example 1: Evaluation of Ionic Conductivity

Each of the solid ion conductor compounds prepared according to Examples 1 to 6 and Comparative Examples 1 to 5 was pulverized by using an agate mortar to prepare powder. Then, 200 mg of the powder was pressed at a pressure of 4 ton/$cm^2$ for 2 minutes to prepare a pellet specimen having a thickness of about 0.900 mm and a diameter of about 13 mm. Indium (In) electrodes each having a thickness of 50 um and a diameter of 13 mm were disposed respectively on both sides of the prepared specimen to prepare a symmetry ell. The preparation of the symmetry cell was carried out in a glove box in an Ar atmosphere.

For the pellet specimen including the In electrodes on both sides, impedance of the pellet was measured according to a 2-probe method by using an impedance analyzer (Material Mates 7260 impedance analyzer). Here, the frequency range was from 0.1 Hz to 1 MHz, and the amplitude voltage was 10 mV. The impedance was measured 25° C. in an Ar atmosphere. The resistance values were obtained from the arc of the Nyquist plot for the impedance measurement results, and the ionic conductivity was calculated in consideration of the area and thickness of the electrodes of the pellet specimen.

The results of ionic conductivity measurement are shown in Table 1.

TABLE 1

| | Ionic conductivity (mS/cm, 25° C.) |
|---|---|
| Example 1 | 3.4 |
| Example 2 | 6.2 |
| Example 3 | 6.8 |
| Example 4 | 7.7 |
| Example 5 | 5.9 |
| Example 6 | 5.9 |
| Comparative Example 1 | 2.8 |
| Comparative Example 2 | 5.5 |
| Comparative Example 3 | 3.5 |
| Comparative Example 4 | 5.6 |
| Comparative Example 5 | 6.0 |

As shown in Table 1, the solid electrolyte compounds of Examples 1 to 6 had ionic conductivity of 3.4 mS/cm or more, suggesting suitability thereof for use as solid electrolytes in all-solid secondary batteries.

Evaluation Example 2: Evaluation of Crystal Structure

Each of the solid ion conductor compounds prepared according to Examples 1 to 6 and Comparative Example 3 was pulverized by using an agate mortar to prepare powder. Then, an X-ray diffraction (XRD) spectrum for the powder was measured, and the results are shown in FIG. 1.

Referring to FIG. 1, when the peak intensity at $2\theta=29.07°\pm0.5°$ was identified as $I_B$ and the peak intensity at $2\theta=30.09°\pm0.5°$ was identified as $I_A$, a value of $I_B/I_A$ was calculated and shown in Table 2.

TABLE 2

| | Ratio of impurities ($I_B/I_A$, %) |
|---|---|
| Example1 | 0 |
| Example 2 | 0 |
| Example 3 | 0 |
| Example 4 | 0 |
| Example 5 | 6.5 |
| Example 6 | 9.3 |
| Comparative Example 3 | 15.7 |

Referring to FIG. 1 and Table 2, it was confirmed that, when the molar ratio of Cl to Br exceeded 1:1 so that the mole fraction of Br became greater than that of Cl (as in Comparative Example 3), the ratio of impurities rapidly increased.

Evaluation Example 3: Evaluation of Softness

Each of the solid ion conductor compounds prepared according to Examples 1 to 3 and Comparative Examples 1, 2, 4, and 5 was pulverized by using an agate mortar to prepare powder. Then, a ratio of pellet density ($\rho_b$) to powder density ($\rho_a$) was calculated and shown in FIG. 2.

The powder density refers to a theoretical value calculated from the most stable structure obtained through VASP which is software for first-principle calculation. The pellet density is measured in a way that, after processing 200 mg of the powder into a pellet having a diameter of 13 mm and applying a pressure of 4 ton/cm$^2$ for 2 minutes to measure a thickness, the pellet weight (200 mg) was divided by volume ($\pi$(13 mm/2)$^2$×measured thickness).

Figure 2:
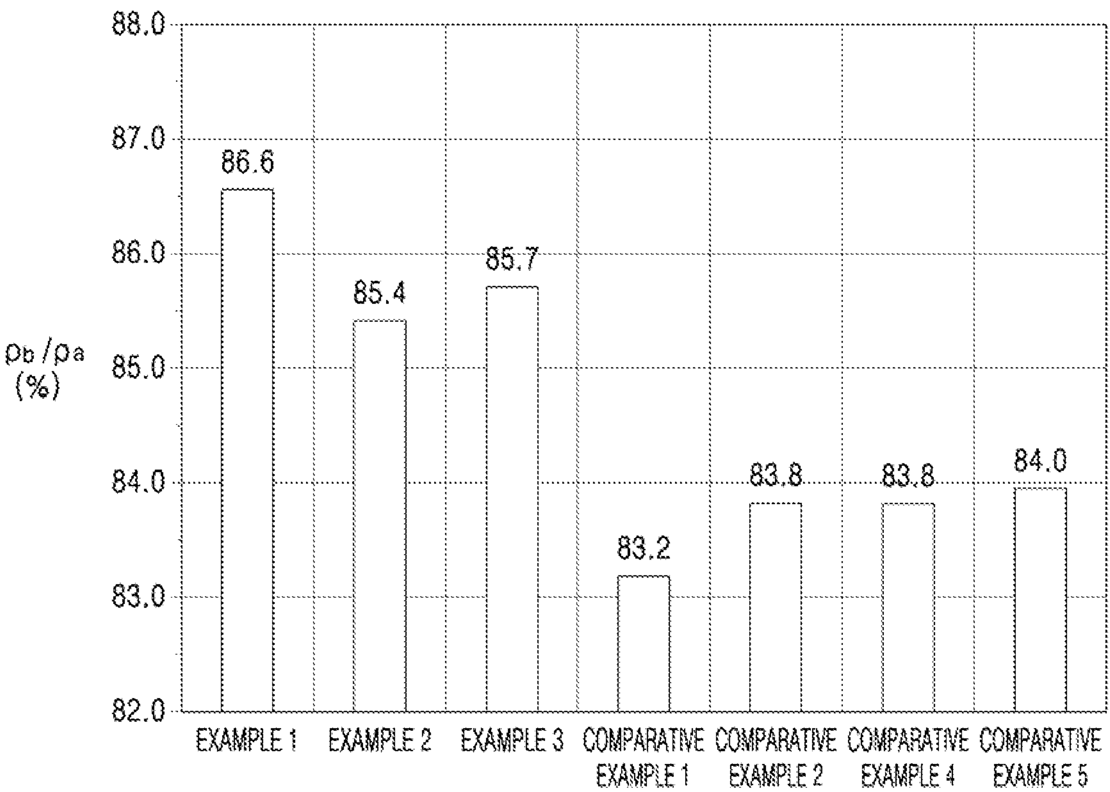
FIG. 2 shows a bar graph showing a ratio of pellet density/powder density in solid ion conductor compounds prepared in Examples 1 to 3 and Comparative Examples 1, 2, and 5.

Referring to FIG. 2, it was confirmed that the solid ion conductor compounds of Examples 1 to 3 including Na, Cl, and (Br or I) had improved ratio of pellet density to powder density, compared to the solid ion conductor compounds including only Cl without Na (Comparative Examples 1 and 2), the solid ion conductor compound including Na and one type of halogen element (Comparative Example 4), and the solid ion conductor compound including only Cl and Br (Comparative Example 5).

The solid ion conductor compound with high ratio of pellet density/powder density suggests that the solid ion conductor compound has excellent contacting properties with other materials for an all-solid secondary battery. In this regard, it was confirmed that the solid ion conductor compounds of Examples 1 to 3 had excellent softness compared to the solid ion conductor compounds including only Na, only Cl, or two types of halogen (Cl and Br), Na and Cl and (Br or I).

Evaluation Example 4: Evaluation of High-Rate Capability

High-rate capability of the all-solid secondary batteries of Example 7 and Comparative Example 7 was evaluated by the following charge/discharge test. The charge/discharge test was performed by putting the all-solid secondary battery in a chamber at 45° C. Each all-solid secondary battery was charged with a constant current of 0.1 C and a constant voltage of 4.25 V until a current value reached 0.05 C. Subsequently, discharging was performed with a constant current of 0.05 C until the battery voltage reached 2.5 V, and discharging was performed up to 2.5 V. Then, after charging with a constant current of 0.1 C, 0.1 C, 0.1 C, and 0.33 C and a constant voltage of 4.25 V, discharging was performed with a constant current of 0.1 C, 0.33 C, 1 C, and 0.33 C, respectively, and changes in discharge capacity was observed.

Figure 3A:
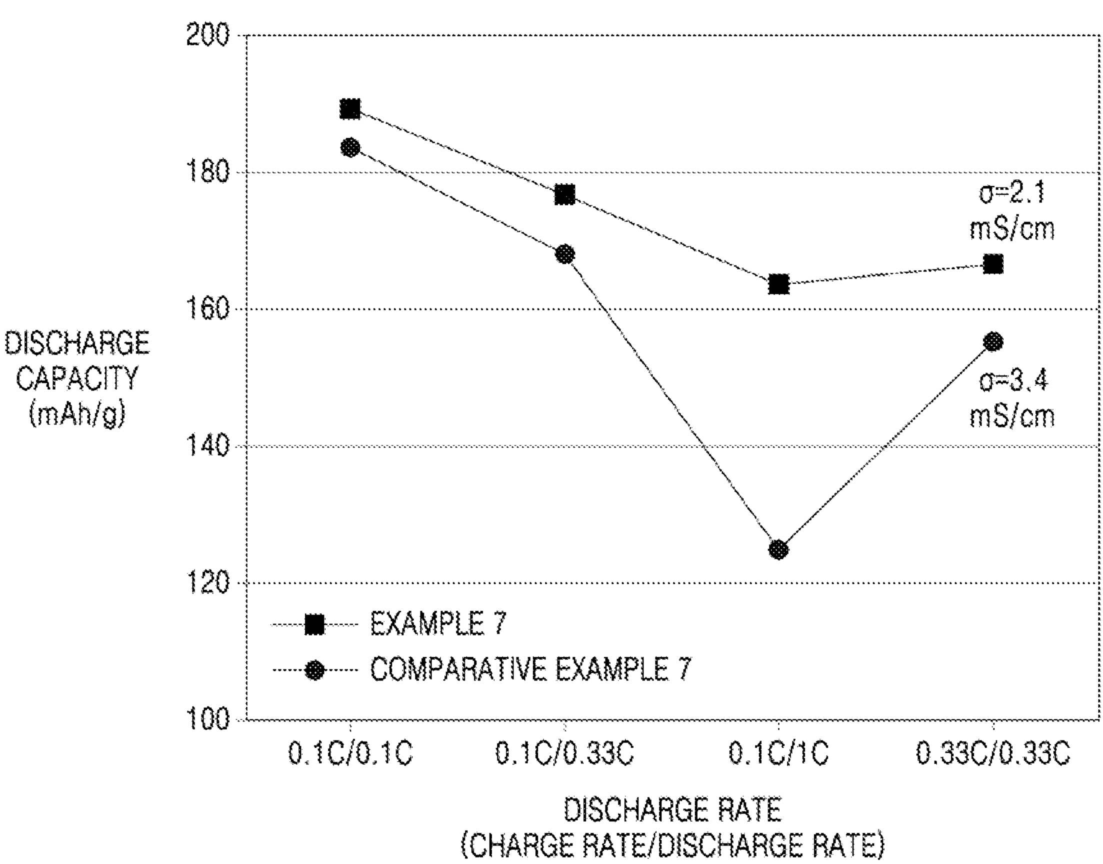
FIG. 3A shows a graph showing discharge capacity per discharge speed of all-solid batteries of Example 7 and Comparative Example 7.
Figure 3B:
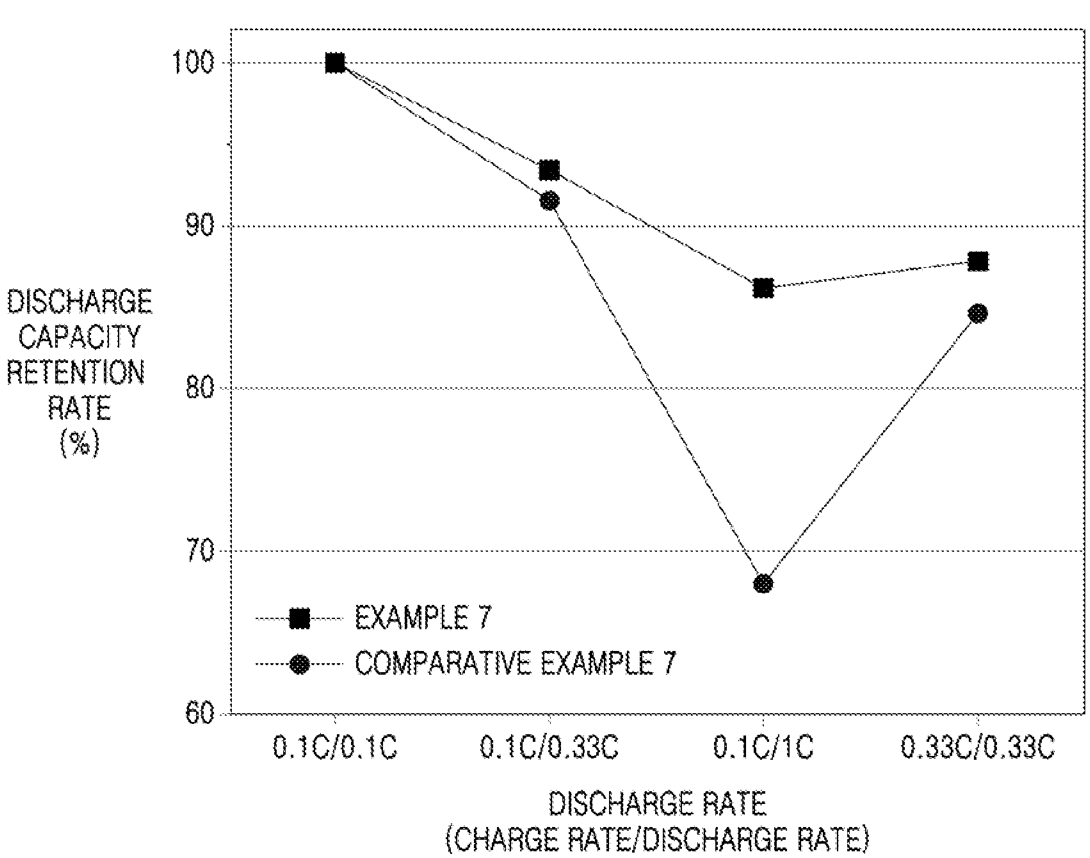
FIG. 3B shows a graph showing discharge capacity retention rates of all-solid batteries of Example 7 and Comparative Example 7.

The discharge capacity and the discharge capacity retention rate for each discharge rate of the all-solid secondary batteries prepared according to Example 7 and Comparative Example 7 are shown in FIGS. 3A and 3B, respectively.

It was confirmed that the discharge capacity (177 mAh/g) of the all-solid secondary battery of Example 7 at 0.33 C increased by about 5% compared to that (168 mAh/g) of the all-solid secondary battery of Comparative Example 7.

In addition, the all-solid secondary battery of Example 7 had an average realization rate of 92% with the discharge capacity of 1 C/0.33 C, suggesting that the rate capability was improved compared to the all-solid secondary battery of Comparative Example 7 having the average realization rate of 74%.

Evaluation Example 5: Evaluation of Moisture Stability

Each of the solid ion conductor compounds prepared according to Example 5 and Comparative Example 1 was pulverized by using an agate mortar to prepare 30 mg of powder ($D_{50}$≈18 um). The prepared powder was placed in a chamber in the air under conditions of 19° C. and relative humidity (RH) of 60%, and the amount of $H_2S$ gas generated in the chamber was measured for 0 minute to 300 minutes.

Figure 4:
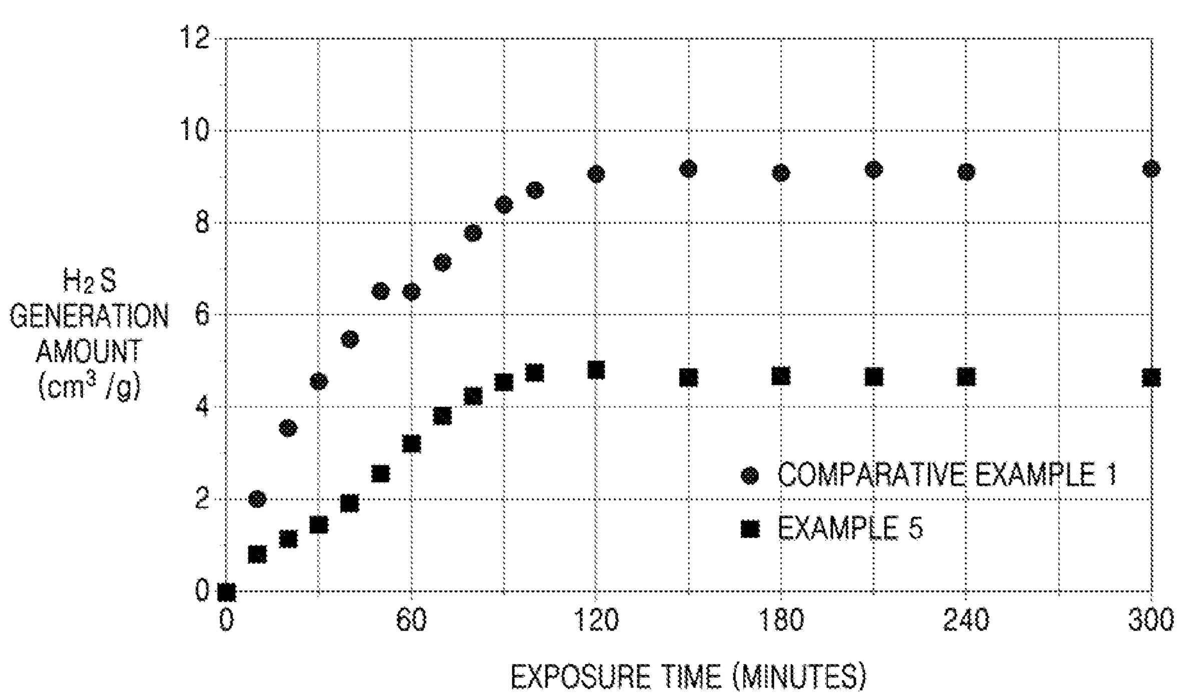
FIG. 4 shows a graph showing changes in the amount of $H_2S$ generated in the atmosphere of solid ion conductor compounds of Example 5 and Comparative Example 1.

The measured results are shown in FIG. 4 and Table 3.

TABLE 3

| | Amount of $H_2S$ gas generated after 300 minutes ($cm^3/g$) |
|---|---|
| Example 5 | 4.8 |
| Comparative Example 1 | 9.2 |

Referring to FIG. 4 and Table 3, it was confirmed that the solid ion conductor compound of Example 5 had improved stability against moisture by introducing heterogeneous halogen elements, such as Cl and Br, and Ge, and that the amount of $H_2S$ gas generated by side reactions of the element S in the crystal was accordingly significantly reduced. It was also confirmed that the solid ion conductor compound of Example 5 had a reduced ratio of $H_2S$ gas generated after 300 minutes by about 48% compared to the solid ion conductor compound of Comparative Example 1.

Evaluation Example 6: Evaluation of Lifespan Characteristics

The charge/discharge test on the all-solid secondary batteries of Example 7 and Comparative Example 7 was performed by placing the all-solid secondary batteries in a chamber having a temperature of 45° C.

In a first cycle, charging was performed with a constant current of 0.33 C and a constant voltage of 4.25 V until the battery voltage reached 4.25 V and the current value reached 0.05 C. Next, discharging was performed with a constant current of 0.33 C until the battery voltage reached 2.5 V.

Afterwards, the same charge/discharge cycles were performed 510 times, and the charge/discharge curves at the first cycle and the 100th cycle were recorded. The discharge capacity of each cycle was measured and shown in FIGS. 5 and 6.

Figure 5:
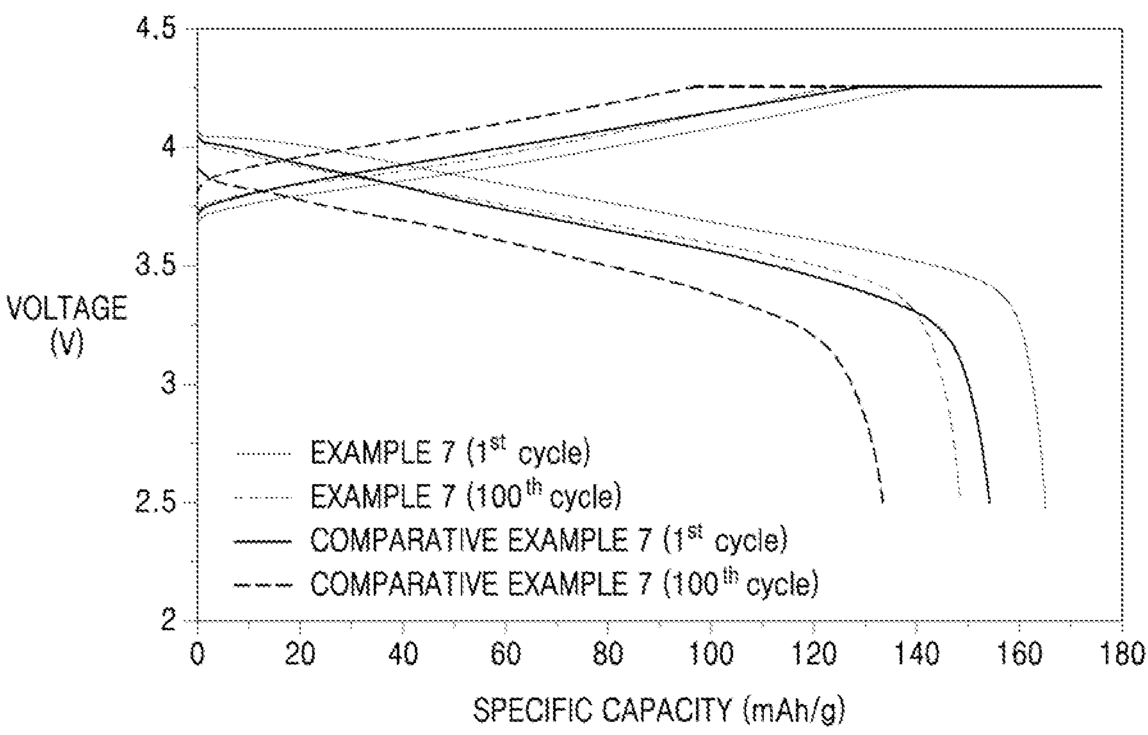
FIG. 5 is a graph showing a charge/discharge curve of all-solid batteries of Example 7 and Comparative Example 7 at the beginning and after 100 cycles.

Referring to FIG. 5, it was confirmed that the all-solid secondary battery of Example 7 had stable charge/discharge characteristics even after 100 cycles, and that the all-solid secondary battery of Comparative Example 7 had a voltage drop and an increase in internal resistance after 100 cycles.

Figure 6:
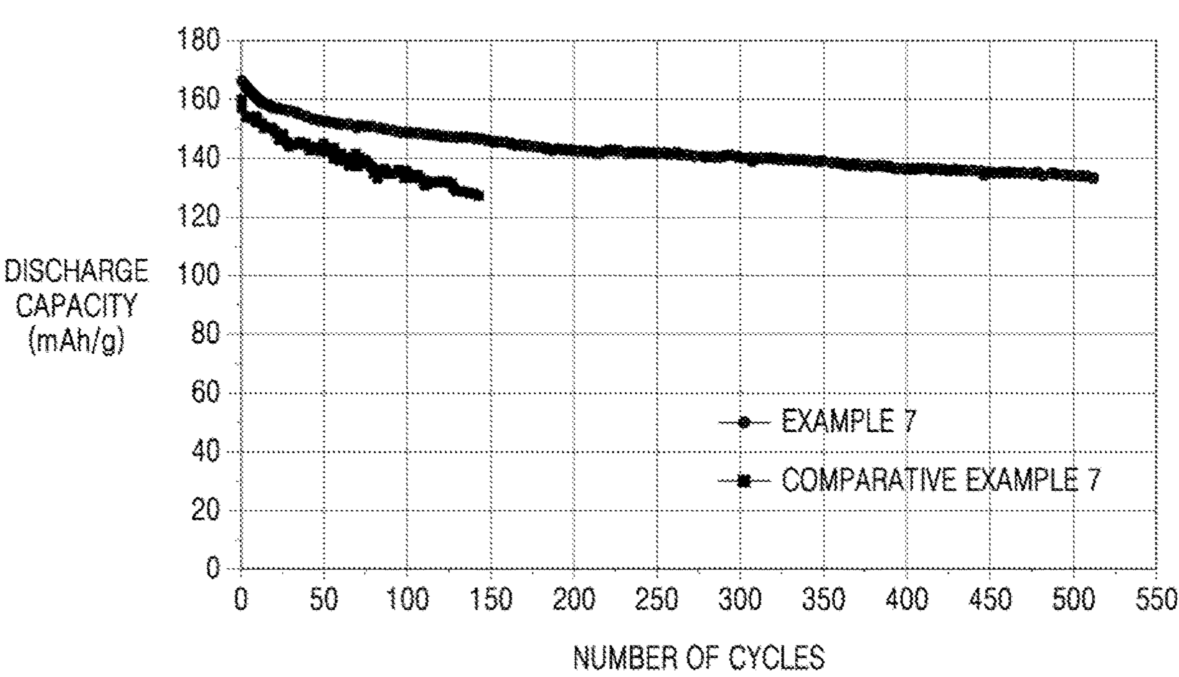
FIG. 6 is a graph showing changes in discharge capacity according to 510 cycles of charge/discharge of all-solid batteries of Example 7 and Comparative Example 7.

Referring to FIG. 6, it was confirmed that the all-solid secondary battery of Example 7 had a capacity retention rate of 80% or more after charging and discharging 510 times or more, and that the all-solid secondary battery of Comparative Example 7 had a short-circuit at the 150th cycle.

Therefore, it was confirmed that the all-solid secondary battery of Example 7 had stable charge/discharge characteristics and excellent lifespan characteristics.

Hereinabove, the preferable embodiments of the present invention have been described with reference to drawings and Examples, but these are only exemplary, and those skilled in the art can understand that various modifications and equivalent other embodiments are possible therefrom. Therefore, the scope of protection of the present invention should be defined by the appended claims.

The invention claimed is:

1. A solid ion conductor compound represented by Formula 1 and having an argyrodite crystal structure:

$$Li_aM_xT_yP_bS_cCl_dX_e \quad \text{Formula 1}$$

wherein, in Formula 1,

Mis Na, K, Rb, Cs, Fr, or a combination thereof,

Ti s Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X is Br, I, or a combination thereof, and $4<a<7$, $0<x<1$, $0<y<1$, $0<b\leq1$, $4<c\leq5$, $1\leq d+e<2$, and $1\leq d/e$.

2. The solid ion conductor compound of claim 1, wherein $0<x\leq0.5$.

3. The solid ion conductor compound of claim 1, wherein $0<y<0.5$.

4. The solid ion conductor compound of claim 1, wherein $1.3\leq d+e<2$.

5. The solid ion conductor compound of claim 1, wherein $1\leq d/e<18$.

6. The solid ion conductor compound of claim 1, wherein $I_B/I_A$ is <0.15 where $I_B/I_A$ is a ratio ($I_B/I_A$) of peak intensity ($I_B$) at diffraction angle ($2\theta$)=29.07°±0.5° to a peak intensity ($I_A$) at $2\theta$=30.09°+0.5° in the solid ion conductor compound in an X-ray diffraction (XRD) spectrum using CuKα rays.

7. The solid ion conductor compound of claim 5, wherein $I_B/I_A$ satisfies the condition of $I_B/I_A\leq0.1$.

8. The solid ion conductor compound of claim 1, wherein Formula 1 is represented by Formula 2:

$$(Li_{1-x1}M1_{x1})_{7+\alpha-\beta}(P_{1-y1}T1_{y1})_{\alpha}S_{6-\beta}(Cl_{1-e1}X1_{e1})_{\beta} \quad \text{Formula 2}$$

wherein, in Formula 2,

M1 is Na, K, Rb, Cs, Fr, or a combination thereof,

T1 is Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X1 is Br, I, or a combination thereof, and $0<x1<1$, $0<y1<1$, $0<e1\leq0.5$, $0<\alpha\leq1$, and $0<\beta\leq2$.

9. The solid ion conductor compound of claim 8, wherein M1 is Na, K, or a combination thereof.

10. The solid ion conductor compound of claim 8, wherein T1 is Ge.

11. The solid ion conductor compound of claim 8, wherein X1 is Br.

12. The solid ion conductor compound of claim 8, wherein β satisfies $1\leq\beta\leq2$.

13. The solid ion conductor compound of claim 1, wherein Formula 1 is represented by Formula 3:

$$Li_{7-x2+y2-d2-e2}M2_{x2}P_{1-y2}T2_{y2}S_{6-d2-e2}Cl_{d2}X_{e2} \quad \text{Formula 3}$$

wherein, in Formula 3,

M2 is Na, K, Rb, Cs, Fr, or a combination thereof,

T2 is Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, Bi, or a combination thereof, X2 is Br, I, or a combination thereof, and $0<x2<1$, $0<y2<1$ $1<d2+e2<2$, and $d2/e2\geq1$.

14. The solid ion conductor compound of claim 13, wherein $0<x2\leq0.5$, $0<y2<0.5$ and $1.3\leq d2+e2<2$.

15. The solid ion conductor compound of claim 13, wherein $0.8\leq d2<2$ and $0<e2\leq0.8$.

16. The solid ion conductor compound of claim 1, wherein the solid ion conductor compound is $Li_{5.57}Na_{0.03}P_{0.9}Ge_{0.1}S_{4.5}ClBr_{0.5}$, $Li_{5.57}Na_{0.03}P_{0.9}Ge_{0.1}S_{4.5}Cl_{0.4}Br_{0.7}$, $Li_{5.57}Na_{0.03}P_{0.8}Ge_{0.2}S_{4.5}Cl_{1.4}I_{0.1}$, or $Li_{5.57}Na_{0.03}P_{0.8}Si_{0.2}S_{4.4}Cl_{1.4}Br_{0.2}$.

17. The solid ion conductor compound of claim 1, wherein the solid ion conductor compound has a pellet density/powder density ratio of 85% or more.

18. A solid electrolyte comprising the solid ion conductor compound according to claim 1.

19. An electrochemical cell comprising:

a positive electrode layer comprising a positive electrode active material layer;

a negative electrode layer comprising a negative electrode active material layer;

an electrolyte layer disposed between the positive electrode layer and the negative electrode layer; and the solid ion conductor compound according to claim 1.

20. The electrochemical cell of claim 19, wherein the positive electrode active material layer comprises the solid ion conductor compound.

21. The electrochemical cell of claim 20, wherein the solid ion conductor compound has an average particle diameter ($D_{50}$) of 2 μm or less.

22. The electrochemical cell of claim 19, wherein the electrolyte layer comprises the solid ion conductor compound.

23. The electrochemical cell of claim 22, wherein the solid ion conductor compound has an average particle diameter $D_{50}$ of 5 μm or less.

24. The electrochemical cell of claim 19, wherein the positive electrode active material layer and the electrolyte layer comprise the solid ion conductor compound.

25. The electrochemical cell of claim 19, wherein the electrochemical cell is an all-solid secondary battery.

26. The electrochemical cell of claim 19, wherein the negative electrode active material layer includes a negative electrode active material and a binder, and the negative electrode active material layer includes a mixture of amorphous carbon with at least one selected from the group consisting of gold (Au), platinum (Pt), palladium (Pd), silicon (Si), silver (Ag), aluminum (Al), bismuth (Bi), tin (Sn), and zinc (Zn).

27. The electrochemical cell of claim 19, wherein the negative electrode layer includes a negative electrode current collector, a metal layer is further disposed between the negative electrode current collector and the negative electrode active material layer, and the metal layer includes lithium or lithium alloy.

* * * * *